(12) United States Patent
Haig

(10) Patent No.: US 7,680,717 B2
(45) Date of Patent: Mar. 16, 2010

(54) HYPOTHETICAL-PORTFOLIO-RETURN DETERMINATION

(75) Inventor: Harold J. A. Haig, Chestnut Hill, MA (US)

(73) Assignee: Cabot Research, LLC, Boston, MA (US)

( * ) Notice: Subject to any disclaimer, the term of this patent is extended or adjusted under 35 U.S.C. 154(b) by 457 days.

(21) Appl. No.: 11/469,729

(22) Filed: Sep. 1, 2006

(65) Prior Publication Data

US 2008/0071696 A1 Mar. 20, 2008

(51) Int. Cl.
*G06Q 40/00* (2006.01)

(52) U.S. Cl. .................................. 705/36 R; 705/37

(58) Field of Classification Search ............. 705/35–37
See application file for complete search history.

(56) References Cited

U.S. PATENT DOCUMENTS

| | | | |
|---|---|---|---|
| 6,928,418 B2 * | 8/2005 | Michaud et al. ............. 705/36 R |
| 6,985,880 B1 * | 1/2006 | Hodgdon et al. ............ 705/36 T |
| 2002/0138386 A1 | 9/2002 | Maggioncalda et al. | |
| 2002/0184131 A1 | 12/2002 | Gatto | |
| 2003/0065605 A1 * | 4/2003 | Gatto ........................... 705/36 |
| 2003/0093352 A1 * | 5/2003 | Muralidhar et al. ........... 705/36 |
| 2003/0126054 A1 | 7/2003 | Purcell | |
| 2004/0181479 A1 * | 9/2004 | Zosin et al. ................... 705/36 |
| 2005/0033679 A1 * | 2/2005 | Rachev et al. ................. 705/36 |
| 2005/0080704 A1 * | 4/2005 | Erlach et al. .................. 705/36 |
| 2005/0108134 A1 | 5/2005 | Harlow et al. | |
| 2005/0171883 A1 * | 8/2005 | Dundas et al. ................ 705/36 |
| 2005/0171886 A1 | 8/2005 | Squyres | |
| 2006/0015425 A1 * | 1/2006 | Brooks ......................... 705/35 |
| 2006/0020531 A1 * | 1/2006 | Veeneman et al. ............ 705/35 |
| 2006/0074785 A1 * | 4/2006 | Festog et al. .................. 705/35 |
| 2006/0190371 A1 * | 8/2006 | Almgren et al. .............. 705/35 |
| 2007/0033125 A1 * | 2/2007 | Ramaswami et al. ......... 705/35 |
| 2007/0112662 A1 | 5/2007 | Kumar | |

OTHER PUBLICATIONS

Barber et al., "All that Glitters: the Effect of Attention and News on the Buying Behavior of Individual and Institutional Investors," Jan. 2005.

Fuller, Russell J., "Behavioral Finance and the Sources of Alpha," Feb. 6, 2000, RJF Asset Management, San Mateo, CA.

Odean et al., "Once Burned, Twice Shy: How Naïve Learning and Counterfactuals Affect the Repurchase of Stocks Previously Sold," Mar. 2004.

(Continued)

*Primary Examiner*—Stefanos Karmis
(74) *Attorney, Agent, or Firm*—Foley Hoag LLP

(57) ABSTRACT

A portfolio-analysis tool receives data that describe an actual portfolio. It computes from those data the returns or other performance measures of hypothetical portfolios whose holdings are drawn from the assets that the actual portfolio held during some period. Among the purposes of doing so is to detect biases made in investment-portfolio actions of the type taken, for instance, to accommodate cash inflows and withdrawals. For that purpose, differences between the hypothetical portfolio and the actual portfolio are so made as to offset portfolio actions identified by finding differences between the weights that positions actually exhibit and the weights they would result from return only. Returns for the hypothetical portfolio are computed by calculating an offset return incrementally, one such offset at a time, and then computing the hypothetical portfolio's return as the sum of quantities proportional to the offset return and that of the actual portfolio.

12 Claims, 7 Drawing Sheets

OTHER PUBLICATIONS

Grinblatt et al., "The Disposition Effect and Momentum," Oct. 2001.

Cici, Gjergji, "The Relation of the Disposition Effect to Mutual Fund Trades and Performance," Jul. 10, 2005.

Gavin, Robert, "Mind Over Money; Behavioral Research May Explain Why People Spend and Save the Way They Do," Dec. 19, 2005, *The Boston Globe*, Boston, MA.

Grinblatt et al., "What makes Investors Trade?" *The Journal of Finance*, vol. LVI, No. 2, Apr. 2001, pp. 589-616.

Feng et al., "Do Investor Sophistication and Trading Experience Eliminate Behavioral Biases in Financial Markets?" May 5, 2005.

Mauboussin et al., "Investing with Style," *The Consilient Observer*, Credit Suisse/First Boston, vol. 1, Issue 1, Nov. 19, 2002, pp. 1-5.

Odean, Terrance, "Are Investors Reluctant to Realize Losses?" *The Journal of Finance*, vol. LIII, No. 5, Oct. 1988, pp. 1775-1798.

Coval et al., "Do Behavioral Biases Affect Prices?" *The Journal of Finance*, Vol. LX, No. 1, Feb. 2005, pp. 1-34.

Karolyi et al., "Why Stock Return Volatility Really Matters," Feb. 2001, Manuscript submitted to *Strategic Investor Relations*.

Rabin et al., "Anomalies, Risk Aversion," *Journal of Economic Perspectives*, vol. 15, No. 1, Winter 2001, pp. 219-323.

Thaler, Richard H., "The End of Behavioral Finance," *Association for Investment Management and Research*, Nov./Dec. 1999.

Schwartz, Barry, "The Tyranny of Choice," *Scientific American*, Apr. 2004, pp. 70-75.

Barber et al., "Is the Aggregate Investor Reluctant to Realize Losses? Evidence from Taiwan," Draft paper privately communicated to applicant on Mar. 9, 2005.

Barber et al., "Who Loses from Trade? Evidence from Taiwan," Jan. 2005.

Barber et al., "Do Day Traders Make Money?" Sep. 2004.

* cited by examiner

| | <0.201 | >0.201 |
|---|---|---|
| WEIGHT | 50% | 50% |
| TURNOVER | 0.38 | 0.33 |
| AGE | 341 | 505 |
| MARGIN | 6.08% | 53.38% |
| CONTRIBUTION | 10.45% | 10.54% |
| BIAS | -0.054 | |
| T-STAT | 0.580 | |
| IMPACT | r: 41 BPS  α: 23 BPS | |

HYPOTHETICAL-PORTFOLIO-RETURN DETERMINATION

CROSS-REFERENCE TO RELATED APPLICATIONS

The present application is related to two commonly assigned copending U.S. patent applications that were filed on the same day as this one by Harold J. A. Haig and are hereby incorporated by reference. One is entitled Portfolio-Performance Assessment, and the other is entitled Determining Portfolio Performance Measures by Weight-Based Action Detection.

BACKGROUND OF THE INVENTION

1. Field of the Invention

The present invention is directed to investment-portfolio assessment.

2. Background Information

Many analytical tools have been developed to help improve portfolio performance. Some, which are not the focus of the invention to be described below, deal with trading. Such tools come into play after a decision has been made to buy or sell a given asset. An essential goal of trading is to buy or sell that asset in such a manner that one's own actions do not affect the traded asset's market price. An effective trade, in concept, would occur at a price equal to what the market price would have been in the absence of the trade. Algorithmic trading is one example of several existing methods used to diffuse trades in such a manner as to minimize or eliminate adverse price impacts.

Distinct from trading, which presupposes decisions to buy and sell, is the portfolio-management domain, to which the invention below is directed, where the decisions about which assets to buy and sell are made. Managing a portfolio of financial assets may involve many theories and principles in finance and practices from investment management. Generally, a portfolio manager gathers asset data, current market-trend data, portfolio-performance data, and the like and analyzes the gathered data to make various determinations. One such determination is the current rate of return being achieved on portfolio assets. Other determinations may be measures of portfolio risk, tradeoffs between alternative assets, measures of how well strategic goals are being met, and estimates of future performance.

Currently there are many software programs that serve as analytical tools for the portfolio manager (as well as for the asset manager, find administrator, and the like). There are various services, pertinent timely publications, and other resources for assisting in the foregoing analyses. Examples include attribution analysis, risk analysis, post-implementation analysis, asset-allocation models, portfolio optimizers, and the like. These systems and services provide information regarding how past performance was achieved, or they provide context in which to make decisions about new investment activity. What most distinguishes these systems from most embodiments of the invention to be described below is that their primary result is the evaluation of past, current, or future performance of specific assets individually. So they affect or evaluate what is referred to as strategic decisions: which specific assets to buy and which assets to sell. Risk analyzers, portfolio strategizers, and some other existing software systems can provide simulations of likely portfolio performance, using forecasting methods that evaluate estimated future outcomes. Other analytic systems recast theoretical portfolios in accordance with historical market information and rules for asset selection to evaluate the effectiveness of hypothetical or alternative portfolio-construction strategies (i.e., methods for selecting assets).

Although such tools are helpful in devising portfolio strategy in a rational way, it has been recognized that the strategy thus set and the trading operations used in response do not alone determine the portfolio's performance. Extensive research and experimentation have shown that it is also affected by aspects of day-to-day portfolio management that are particularly vulnerable to irrational and non-optimizing decision-making.

Such decision-making tends to occur, for example, in connection with moving assets into and out of the portfolio to accommodate investors' contributions and withdrawals. For instance, the objective of selling off 5% of a portfolio can be accomplished through any number of tactics. The portfolio manager can sell 5% of each asset position or sell all or most of a few assets that add up to 5% of the portfolio. The manager can also choose to reach this objective by selling assets owned the longest or assets whose market value is above or below their purchase price.

The choice of tactics to use in buying assets is similarly broad. A manager who is trying to increase the portfolio's exposure to an economic sector (e.g., biomedical, banking, technology, etc.), for example, can spread out the purchase across all assets comprising the sector, concentrate the purchase in a few sector assets, or meet the goal by buying only one asset in the sector. Selection of the approach may depend on many factors, not all of which are consistent with traditional economic theory.

The understanding of tactical biases that tend to drive such selections is an extension of work done over the past thirty years in the academic area known as behavioral economics or behavioral finance. Behavioral economics is the intersection of psychology and economics. Emotions, ignorance, and faulty cognition work to make human decision making fall short of the purely rational model. This research indicates that highly trained, professional investment managers fall prey to these same biases. Biases routinely drive tactical portfolio-investment decisions, and their impact is, in all likelihood, non-optimizing, largely unintended, and certainly unexamined or unmeasured. Yet these unexamined biases regularly affect the performance of tens of thousands of professionally managed investment portfolios.

Among the types of bias that have been observed is the propensity to favor selling appreciated assets rather than those that have depreciated. This preference for selling winners over losers does not, in any systematic way, have much to do with which assets may perform better in the future. Empirical research instead suggests that this type of behavior, referred to in economic literature as the "disposition effect," is non-optimizing and may be motivated by the desire to experience the emotional pleasure of locking in a win while avoiding the unpleasant realization of a loss. A second example of investor bias involves the predisposition to buy assets that were previously owned and sold at a gain. Such a bias, referred to as contra-positive investing, is based entirely on subjective factors and reflects no objective criteria regarding the familiar asset's expected future performance relative to less-familiar ones. In both cases the biased decision is neither reflective of a portfolio strategy nor germane to realizing effective trading.

Although such biases certainly affect the quantities that existing software systems measure, those quantities tend not to be well suited to helping portfolio managers focus on them or on others of the portfolio performance's more-tactical aspects.

SUMMARY OF THE INVENTION

The commonly assigned co-pending U.S. patent applications of Harold J. A. Haig for "Portfolio-Performance Assessment" and "Determining Portfolio Performance Measures by Weight-Based Action Detection" that were filed on the same day as this application describe approaches to assessing portfolio performance that are particularly well suited to obtaining performance measures sensitive to that performance aspect. The techniques by which some embodiments of those approaches arrive at such measures include computing the returns of hypothetical portfolios that result from modulating actions taken in the actual portfolio. Systems that use approaches of that type give the user an assessment of the actual portfolio's performance by generating an output obtained by comparing the hypothetical portfolio's results with those of the actual portfolio and/or with another hypothetical portfolio. I have devised a way of computing such returns that scales particularly well to large numbers of actions to be modulated.

In accordance with my approach, the hypothetical portfolio's return is computed by adding to a quantity proportional to the actual portfolio's return a "final offset return," and an output based in some way on the return thus determined is generated. Typically, the final offset return will be a quantity proportional to the return of an offset portfolio whose positions are drawn from the assets held by the actual portfolio during some observation interval.

Most embodiments will identify a plurality of actions and/or positions in the actual portfolio that are to be offset in arriving at the hypothetical portfolio. For each such offset o of a position or action in a given asset s, a respective weight $w(o, i)$ for each day (or other record time) i for which that offset is to be applied is determined such that the sum of (1) the actual portfolio's return weighted by $w(o, i)$ and (2) an offset return $or(o, i)$ equal to the given asset's return weighted by $1-w(o, i)$ yields the return that the actual portfolio would have exhibited in the absence of the action or position to be offset.

As will be explained below, the final offset return is then computed by repeatedly computing offset returns by adding together quantities proportional to respective constituent returns of which each is either a previously computed offset return or the return of one of those assets. The result is a sequence of computations that requires very few quantities to be held in memory at one time, so it can be performed with few page faults and I/O operations. Additionally, significant computational savings result when the results are being computed for large number of different portfolios derived from the same actual portfolio, because offsets for common subsets of actions and/or positions do not have to be re-computed.

DETAILED DESCRIPTION OF AN ILLUSTRATIVE EMBODIMENT

Figure 1:
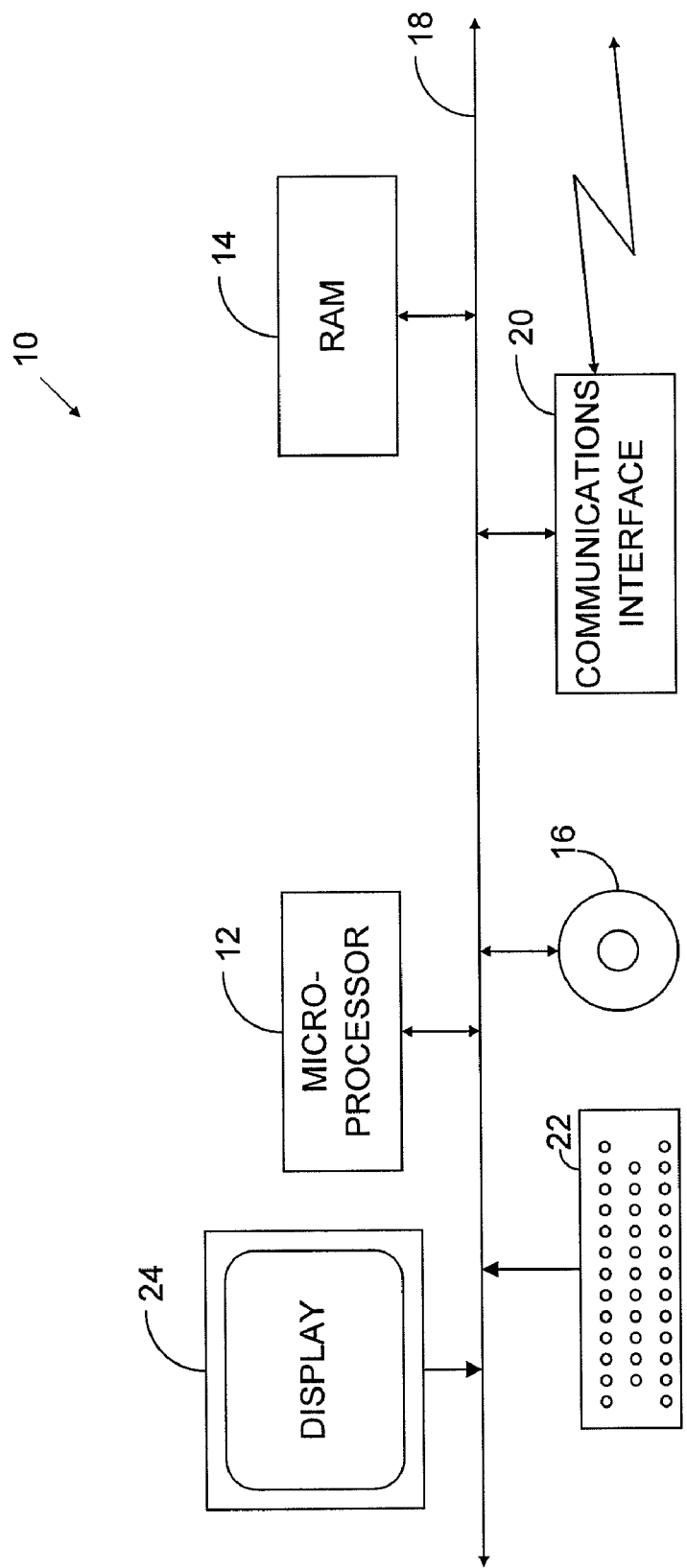
FIG. 1 is a block diagram of one type of computer system on which the present invention's teachings can be implemented.

Although the present invention can be practiced in virtually any type of computer system, and although data employed by the system will probably be supplied in many cases from separate, often remote, server systems, it can in principle be implemented in a simple personal computer such as the one that FIG. 1 depicts. That computer 10 includes among its usual components a microprocessor 12, a RAM 14, and persistent storage, such as a local disk drive 16, interconnected by a bus 18. For the sake of simplicity we will assume that the disk drive not only contains program code that configures the computer system to perform the analyses described below but also stores investment data that describe one or more portfolios and include relevant market information. Such program code may have been loaded onto the disk from a removable storage device or through a communications interface 20 from some remote source. The data may have been obtained similarly.

Possibly in response to commands entered from, for example, a keyboard 22, the system would perform a selected analysis, and it would produce an output indicative of the result, possibly sending it out through the communications interface 20 or presenting it in human-readable form on a display 24 or other output device.

The software configures the computer system as an analysis tool that analyzes investment tactics by operations that in many cases include identifying and offsetting portfolio actions such as the sales and purchases of assets. The purposes for such operations may include detecting tactical biases, assessing their statistical significance, measuring their impacts, and determining how effectively proposed tactical modifications would be in reducing those impacts or otherwise improving tactical performance. Such an analysis can be applied to portfolios of any asset type, examples of which include stocks, bonds, options, asset-backed securities, real property, commodities, mutual funds, Exchange Traded Funds (ETFs), cash or cash-equivalents, and individual portfolios in a group of portfolios and/or other assets. It can be used to evaluate any form of economic interest in financial assets, such as direct ownership, indirect ownership, loans, mortgages, options, short-selling, short-covering, etc. And it is applicable to any portfolio structure, such as a mutual fund, a hedge fund, a private portfolio, a partnership, a bank, an insurance company, a pension fund, etc.

Among the modes in which the system to be described below can be used to evaluate investment tactics are: a) direct analysis, where tactics are modified and an output is generated from the resulting adjusted portfolio's performance, b) comparative analysis, where that output in some way compares the adjusted portfolio's performance with the subject portfolio's, and c) bias analysis, where portfolio assets are partitioned into two or more groups in accordance with one or more investment attributes, the adjusted portfolio is obtained by modulating actions on assets in accordance with the groups to which the assets belong, and the output is based on the performance of the adjusted portfolio, either directly or in comparison with the subject portfolio.

One of the purposes for which the illustrated embodiment can be used is bias analysis; it can be used to identify and measure the impact of a multitude of biases. Such biases can be based on any attribute or characteristic associated with investment decisions. Examples of biases include: a) the gain effect, which is the tendency to sell assets with a gain or profit disproportionately; b) the age effect, which is the tendency to sell an asset in accordance with its tenure; c) the stop-loss effect, which is selling off assets that drop in value precipitously; d) the experience effect, which is the tendency for purchases and/or sales of a specific asset to be influenced by experiences with previous holdings in the same asset, and e) the attention effect, which is the tendency to buy and/or sell assets during periods of unusually high relative trading volume. (A security's volume on a given day is the total value of that security that changed hands on that day in the whole market for that security, whereas the relative trading volume is the ratio of that value to the average of volume over time.)

Figure 2:
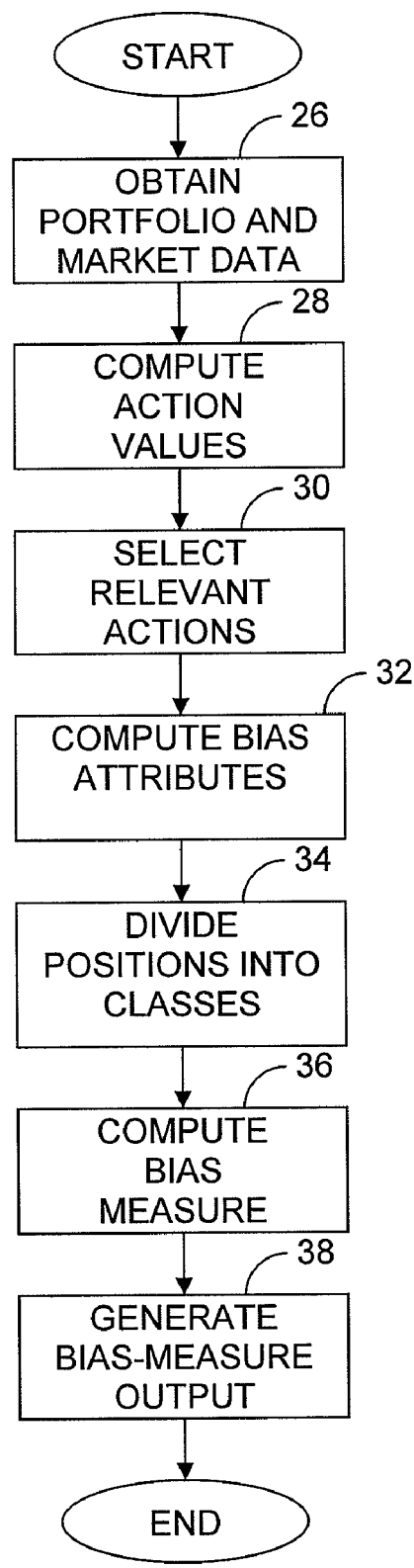
FIG. 2 is a flow chart of a routine used by the illustrated embodiment to compute a bias measure.

FIG. 2 depicts the routine that the illustrated embodiment uses to produce a bias measure. As other embodiments will, the illustrated embodiment requires detailed historical portfolio and market data upon which to base the analysis, and FIG. 2's block 26 represents obtaining those data. The portfolio data would either describe the assets bought, sold, and held over some historical period or contain information from which such quantities can be inferred. The length of the historical period will depend on the situation, but, to obtain results that are statistically meaningful, a duration of, say, at least six months is preferable.

The system will typically although not necessarily receive portfolio-specific data separately from data for the market in general. The signals representing the portfolio data can be sent from a keyboard but will more often come from a communications interface or removable storage medium. The data will represent the actual portfolio's positions in respective assets for each of a sequence of market days or other record times. (The data will usually describe a real-world portfolio, but we will refer to portfolios represented by the input data as "actual" portfolios even if no real-world portfolio corresponds to them.) Often, those data will represent that information compactly. For example, the data may in some cases be presented predominantly in terms of trades, so that the absence of an explicit entry for a given stock on a given day represents the fact that the portfolio contains the same number of shares, on a split-adjusted basis, as it did after the trade represented by the last explicit entry for that stock.

Although these data's precise type will depend on the application, let us assume for the sake of concreteness that the portfolio information available to the illustrated embodiment includes, for each asset, for each reporting observation during the analysis timeframe: a unique identifier (e.g., its CUSIP number); the amount held (which may be given as numbers of shares, as a dollar or other-currency value, as a weight—i.e., in terms of the percentage of the total portfolio value that the asset represents—or in some other convenient measure); a detailed list of all portfolio transactions; net purchases or sales; and net portfolio income earned other than from asset performance (e.g., interest on cash, fees from lending assets, cost of margins or shorting, etc.). The data may also specify or enable one to infer net cash flows in or out for the portfolio for each observation time, although most analyses that the illustrated embodiment performs do not require such information.

In principle any observation frequency can be used, such as quarterly, monthly, weekly, daily, hourly, etc., or any combination thereof. In practice, daily data will likely be the most typical. For the sake of convenience we will therefore refer to successive observations of the portfolio positions' values on a sequence of "days," but day should be understood as a proxy for whatever observation period is convenient. Similarly, we will use the term stock for the sake of convenience to refer to any investment asset, not just those of the equity variety. We will also use the term position for the sake of convenience to refer to the total amount of any investment asset held in a portfolio. For example, if stock A has a market value or price of $15.00 and 100 shares are held in the portfolio, the dollar position of stock A is equal to $1,500 (15.00×100=1,500). The same position expressed in weight terms would be the result of the dollar position divided by the portfolio's total dollar value.

The illustrated embodiment next uses the historical portfolio data to determine the daily weights of each position, as FIG. 2's block 26 indicates. Some embodiments may utilize weights provided as part of the portfolio data, and other embodiments may determine them from other portfolio data. The illustrated embodiment both accepts weights as an input and determines them from portfolio data stated in other terms. We will describe the determination of position weights as part of this illustration.

The daily weight $w(s, i)$ of the position in an asset s on day i is determined as the ratio of the beginning-of-day ("bod") value for the position divided by the total portfolio's bod value. So the position weight for any day i indicates the relative size of the asset within the portfolio prior to any actions (buys, sells), as well as any corporate events, of the asset on that day. For example, if asset z had a bod position value of $300 and the total portfolio's bod value for the same day was $10,000, then the position's weight for that day was 0.03 (300/10,000).

The quantity defined above as an asset s's weight $w(s, i)$ on day i is the quantity most intuitively appealing for that purpose; the sum of the weights of all the portfolio's assets is then 1.0 (with shorts and margin assigned negative weights, as discussed below). Some embodiments may include cash as an asset, while other embodiments may exclude cash, focusing exclusively on non-cash assets. But it is possible to use some other quantity that indicates how much of the portfolio the position in stock s represents on day i; some embodiments may represent weights as spreads relative to a benchmark, for example, in which case negative weights would be assigned to any underweighted position, and the sum of the weights would be zero. So, if the S&P 500 Index contained 1.5% of asset X and the subject portfolio contained 1.2% of asset X, the relative weight of the asset would be (0.003) or a negative 0.3%.

To explain how the illustrated embodiment uses these data to assess bias, we will use the variables defined below to refer to the portfolio data, market data, and quantities that we can derive from them. First, we will adopt the following index variables and definitions:

s will represent "stocks," as broadly defined above; the analysis below can be performed for any collection of assets or securities, including standard and arbitrary representations of assets such as sectors, industries, individual asset portfolios in a set of portfolios and/or other assets, or for any factor relating to stock returns, including style.

S will represent all stocks comprising the relevant universe throughout the appropriate historical timeframe. Examples of asset universes include: all bonds issued in North America, all stocks traded on the Tokyo Exchange, all commodities traded on the Chicago Mercantile Exchange, or all stocks comprising the Standard & Poor's 500 Index (S&P 500). The members of any universe may change over time, with the likelihood of change increasing as the timeframe lengthens. A universe of particular interest here is the set of all assets held at one time or another by the portfolio of interest during some observation interval.

S(i) represents all stocks in the relevant universe on day i, commonly those stocks comprising the subject portfolio or its comparative benchmark. So S(i) is a subset of S i, j, k, and l all represent days.

p represents a period, i.e., a number of days.

The illustrated embodiment supplements the portfolio data with market data. Examples of general market data, which would typically be obtained separately from the portfolio data, include the following:

a. price(s, i) will represent the price of stock s at the close of day i.

b. incomeAmount(s, i) will represent ordinary dividend of security s with ex-day of i. (If entitlement to the dividend is determined, as is typical, by ownership of the security at the end of a given day, the following day is that security's ex-day).

c. eventAmount(s, i) will represent special dividend or proceeds from spin-off on ex-day i.

d. splitFactor(s, i) will represent the split factor on ex-day i.e.

e. volume(s, i) will represent the volume of market transactions on day i.

Those skilled in the art will be familiar with the use of these market data in determining the return of a stock for any day i and over any period of time (i, j). Examples of other fundamental data that some embodiments may use instead or in addition are earnings per share, book value per share, short-term forecasted earnings-growth rate, long-term forecasted earning-growth rate, etc. Among the analyses that the illustrated embodiment can perform is, as was mentioned above, bias detection. The biases that the illustrated embodiment will be used to detect are biases in taking what we call investment "actions," and FIG. 2's block 28 represents identifying actions by computing "action values" from the portfolio and market data. Before we discuss how it computes those values, though, we will consider what kinds of actions are of interest.

A given position's action value will be taken to be some measure of the degree to which a position differs from what it would have been in the absence of the portfolio manager's actions. Among systems that use various aspects of this application's teachings, there will likely be some variation in just what types of differences are considered for this purpose. Some such systems, for instance, may consider differences in a position's dollar value or differences in numbers of shares. Therefore, such systems will consider an action of some magnitude to have occurred in any position to which the manager has added additional shares.

But the types of differences that are considered by the embodiment on which we will principally concentrate are not dollar or share differences; they are weight differences, and most of the quantities to be dealt with below are based on weight. It will therefore be helpful to mention a couple of the implications of operating in the weight domain. One is that a position is expressed in the weight domain as the ratio of its dollar (or other-currency) value to that of the portfolio as a whole. So, whereas the total of all of a portfolio's positions in dollar or share terms may change from day to day, the total in weight terms always equals one.

The other implication is that weight-based action values differ from dollar- or share-based action values not only in the terms used to express them but also in whether an action is considered to occur at all. For example, consider a day on which a portfolio manager receives a large infusion of funds and promptly so invests them that the dollar values of all his positions end up being double what they would have been if no such transactions had occurred. A dollar-valued action measure will reflect significant actions in all those positions. But the weights are all what they would have been in the absence of those transactions. As we explain below, we call such weight values the positions' "no-action weights," and we treat a position's action value in the weight domain as the difference between its no-action and actual weights. So a weight-based action assessment in this scenario would find no action in any position even though a dollar-based assessment would find actions in all of them.

We now turn in detail to the various quantities that the illustrated embodiment uses in making such assessments. To compute action values as depicted in FIG. 2's block 28, the illustrated embodiment relies upon the following definitions:

r(s, i) is the return of security s on day i. Asset returns are derived from the market information described above. There may be some variation in what various embodiments consider to be included in return; those that the illustrated embodiment includes will be identified in due course.

r(s, i, j) is the return of the security s from the end of day i−1 to the end of day j:

$$r(s, i, j) = \prod_{k=i,j} (1 + r(s, k)) - 1$$

c(s, i) The contribution c(s, i) on day i of a position in asset s is the measure of the proportion of the portfolio's return for that day that the asset-s position contributed. That contribution is the product of asset s's position weight and its return:

$$c(s,i) = w(s,i) \cdot r(s,i)$$

So contribution is positive when a gain occurs and negative when a loss occurs.

pr(i) is portfolio return or the return for all assets s held for each day i:

$$pr(i) = \sum_{s \in S(i)} c(s, i)$$

pr(i, j) is portfolio return from the end of day i−1 to the end of day j:

$$pr(i, j) = \prod_{k=i,j} (1 + pr(k)) - 1$$

Action Identification

In the illustrated embodiment an action is something that tends to be the result of decisions made by portfolio managers; as was mentioned above and will be explained in more detail presently, an action is a difference between the actual weight and the weight that would result if the portfolio were affected only by returns. Although not all actions under this definition map one-to-one to dollar-value purchases and sales, we will characterize all such actions on long positions as either buys or sells, whereas actions on short positions will all be characterized as shorts or covers. For convenience we will focus this illustration on "buying" and "selling" long positions.

To discern an action based on weights we begin by calculating an asset's no-action weight. In the illustrated embodiment, the no-action weight naw(s, i) for an asset s on day i is based on that asset's return $r(s, i-1)$ from the prior day relative to the entire portfolio's return $pr(i-1)$ on the prior day:

$$naw(s, i) = \frac{1 + r(s, i-1)}{1 + pr(s, i-1)} w(s, i-1)$$

The no-action weight is the weight that an asset that would be expected to have on day i if no transactions occurred on the prior day, and a position is considered to have been subject to an action on the previous day only if its weight differs from its no-action weight. The no-action weight moves proportionally to the return of the stock (s) relative to the return of the portfolio (S). For example, if assets x and z were the only assets in a portfolio, they are equally weighted on day i−1, and their respective returns for day i 1 were 2% and 0%, then the no-action weight naw(x, i) of asset x on day i equals (1.02× 0.50)/(1.02×0.50+1.00×0.50)=50.5%, while asset y's is (1.00×0.50)/(1.02×0.50+1.00×0.50)=49.5%.

Having determined both the daily weight and the no-action weight for each asset s's position, the system performs the operation that block 30 represents: it computes the weight action(s, i) of an action in asset s on day i as the weight of the asset on day i+1 minus the no-action weight on day i+1:

$$action(s, i) = \Delta w(s, i)$$
$$= w(s, i+1) - naw(s, i+1)$$

A typical analysis (bias or otherwise) may concern itself with only certain components of the actions, i.e., only with action components that meet certain action criteria. For example, a given analysis may concern itself only with actions that decrease a position's weight (e.g., a sell for a long position). A further criterion may be that the action occur in a given type of position. For instance, most analyses will restrict their attention to actions that occur in assets other than cash. The block-30 operation therefore includes restricting the actions to those that are relevant to the particular analysis currently being performed. This often involves classifying the actions in accordance with one or more of those criteria. To this end the illustrated embodiment divides actions into components—e.g., into sells and buys in a long-position-only portfolio—to which it assigns corresponding values.

To understand how the illustrated embodiment arrives at these values, consider sells. In a long-position-only portfolio, an action is a sell only if the action's value (i.e., the amount by which the next day's weight is algebraically greater than the no-action weight) is negative:

$$sell(s, i) = \begin{cases} -\Delta w(s, i) & \text{if } \Delta w(s, i) < 0 \\ 0 & \text{otherwise} \end{cases}$$

A buy action is defined similarly:

$$buy(s, i) = \begin{cases} \Delta w(s, i) & \text{if } \Delta w(s, i) > 0 \\ 0 & \text{otherwise} \end{cases}$$

Sometimes it is useful to understand the level of selling or buying that is occurring within the portfolio as a whole. The illustrated embodiment uses the above-defined sell value to compute the sum sales(i) of every sell(s, i) of an asset s in the portfolio on day i:

$$sales(i) = \sum_{s \in S(i)} sell(s, i)$$

From that value the turnover of portfolio from day i to the end of day j can be determined by summing sells over the relevant time period:

$$turns(i, j) = \sum_{k=i}^{j} sales(k)$$

The turns value can be annualized by using the following expression:

$$turnover(i, j) = \frac{\sum_{k=i}^{j} sales(k)}{j - i + 1} \cdot 252,$$

where 252 is the average number of trading days in a year.

Determining Asset Attributes

Certain analyses, such as measuring the bias of selling winners disproportionately to losers, require selecting or sorting assets by various financial attributes or characteristics. In many analyses the attribute will be a quantity introduced in the following discussion, or it may be a combination of them or some different quantity.

Selling an asset can involve selling all or a portion of a position. The proportion of asset s's position sold on day i is referred to as fraction realized fr(s, i), which is calculated as the ratio of that asset's sell on day i divided by its no-action weight on the next day:

$$fr(s, i) = \frac{sell(s, i)}{naw(i+1)}$$

When 100% of an asset is sold on day i, its no-action weight on day i+1 will be the same as its previous day's sell value, and the resulting fraction realized will equal 1.0. When less than all of the asset position is sold on day i, its no-action weight on day i+1 will be greater than the value of sell(s, i), and the resulting fraction realized will be between zero and 1.0.

Buying an asset can involve adding a new position or adding to an existing position. The proportion fp(s, i) of the position in stock s bought on day i is calculated as the ratio of that asset's buy on day i to its weight on the next day:

$$fp(s, i) = \frac{buy(s, i)}{w(i+1)}$$

Since the position weight is calculated as of the beginning of each day, any buy on day i that initially establishes the portfolio's position in a given asset will have the same value as that position's weight on day i+1, and the resultant fraction purchased will equal 1.0. For incremental purchases the amount purchased on day i will be less than the position's weight on day i+1, with the resulting fraction purchased being between zero and 1.0.

In some embodiments it will be useful to consider the portion of a position that was not sold. This fraction unrealized fu(s, i) is calculated as 1 minus the fraction realized:

$$fu(s,i)=1-fr(s,i)$$

In determining certain bias impacts it is useful to measure portfolio positions' profitabilities (gains/losses). One common measure of profitability is unrealized margin. Unrealized margin is the ratio of unrealized profits to cost basis. To help define margin consistently with the illustrated embodiment's weight scheme, we define a series of intermediate quantities.

Whereas many of the quantities defined so far have been stated in weight terms, i.e., in how many dollars of that quantity there are on a given day for every dollar of total portfolio value on that day, it will be convenient instead to define certain other quantities in what we call "unit-dollar" terms, which is the number of dollars of some quantity on a given day for each dollar of the total portfolio value on day 0 rather than for each dollar of the total portfolio value on the given day.

One example of such a quantity is unrealized contribution. For a given asset s, unrealized contribution uc(s, i, j) tells how many dollars of the day-j portfolio value were contributed by the return on that asset since some day i for each dollar of the portfolio's value on day 0. Our discussion of that value will use two interim terms: scaling factor and gain.

The scaling factor sf(i) indicates how many dollars of portfolio value on day i there are for every dollar of portfolio value on day 0:

$$sf(i)=1+pr(0,i-1)$$

It is used to compute the dollar unit value unitValue(s, i) of asset s on day i:

$$unitValue(s,i)=w(s,i)\cdot sf(i),$$

which indicates how many dollars of asset s there are on day i for every dollar of day-0 portfolio value.

A stock s's day-i gain g(s, i) is the product of its contribution c(s, i) and the scaling factor sf(i):

$$g(s,i)=sf(i)\cdot c(s,i).$$

Having defined these quantities, we can define an asset s's day-j unrealized contribution uc(s, i, j) since day i. What we want is a dollar-equivalent quantity that represents only that portion of a position's contribution that has not come out of the position by sales. To that end, we assume that each partial sale's proceeds come from all of that position's components proportionately; a sale on day j of one-third of a position—i.e., a sale that leaves a fraction unrealized of two-thirds—leaves behind two-thirds of day j−1's unrealized contribution, two thirds of day j's additional gain, and two-thirds of every other component of the position, such as its cost. So we can compute uc(s, i, j) inductively as the product of day j's fraction unrealized fu(s, j) and the sum of the previous day's unrealized contribution uc(s, i, j−1) and day j's (dollar-equivalent) gain g(s, j):

$$uc(s,i,j)=fu(s,j)\cdot[uc(s,i,j-1)+g(s,j)]$$

For example, suppose that day j is the day on which the portfolio's position in an asset s is first established and that no sales occur on day j. Since no sales occurred on day j, the fraction unrealized is unity. Therefore, that position's day-j unrealized contribution uc(s, i, j) since any previous day i will equal the sum of (a) previous day's unrealized contribution, which is zero because the asset position did not exist then, and (b) the gain that occurred on day j. That is, the unrealized contribution is simply the gain from day j. Since gain is a dollar equivalent, so is unrealized contribution.

An asset s's unrealized margin um(s, i, j) is a measure of the degree to which that asset has been a winner or loser in the interval from day i to day j. It can be computed from unrealized contribution as the ratio of that quantity to the amount by which asset s's day-j unit value exceeds that quantity:

$$um(s, i, j) = \frac{uc(s, i, j)}{unitValues(s, j) - uc(s, i, j)}$$

Related values for realized margin and margin as a whole can be defined with the aid of a few additional definitions The unit-dollar quantity that represents the contributions since day i that are realized from a sale of stock s on day j is:

$$ra(s,i,j)=fr(s,j)\cdot[uc(s,i,j-1)+c(s,j)\cdot(1+pr(0,j-1))]$$

Of the contributions from asset s since day i, the unit-dollar quantity for the total realized during the period from j to k is given by:

$$rc(s, i, j, k) = \sum_{l=j}^{k} ra(s, i, l)$$

The unit-dollar quantity for total sales from day j through day k is:

$$proceeds(s, j, k) = \sum_{l=j}^{k} sell(s, l)\cdot(1 + pr(0, l-1))$$

These quantities enable us to define a quantity realizedMargin(s,i,j,k) that represents what the profit margin in the asset-s position is over the period from day j to day k if the basis is taken as that position's value on day i:

$$realizedMargins(s, i, j, k) = \frac{rc(s, i, j, k)}{proceeds(s, j, k) - rc(s, i, j, k)}$$

The total margin, which is a combination of the realized and unrealized margins, is given by:

$$margins(s, i, j, k) = \frac{rc(s, i, j, k) + uc(s, j, k)}{unitValues(s, k) + proceeds(s, j, k) - rc(s, i, j, k) - uc(s, j, k)}$$

Among other values used in partitioning assets is age. An asset s's age age(s, i) on day i is the average time it has been held in the portfolio up to day i, weighted by interim purchases:

$$\text{age}(s, i) = \begin{cases} 1 + (1 - fp(s, i)) \cdot \text{age}(s, i-1) & \text{if } w(s, i) \neq 0 \\ 0 & \text{if } w(s, i) = 0 \end{cases}$$

Thus, for two assets y and z both held in the portfolio for the same number of days, asset y will have a lower age if it experienced interim buys and asset z did not.

A complementary quantity life(s, i) is the average time that an asset s will remain in the portfolio from day i until the point at which it is fully liquidated—i.e., until w(s, i)=0. The measure used by the illustrated embodiment takes interim partial sales into account:

$$\text{life}(s, i) = \begin{cases} 1 + (1 - fp(s, i)) \cdot \text{life}(s, i+1) & \text{if } w(s, i) \neq 0 \\ 0 & \text{if } w(s, i) = 0 \end{cases}$$

Thus, for two assets y and z, both of which will be held in the portfolio for the same number of days, asset y's life will be less if it will experience interim partial sales and asset z will not.

If no sells occur in the asset-s position until after day j, the cost value cost(s, i, j) is its weight on day i plus the sum of all buy actions that occur from that day through day j−1. If sells occur during that interval, they reduce the cost proportionally:

$$\text{cost}(s, i, j) = \frac{w(s, j) \cdot [1 + pr(0, j-1)] - uc(s, i, j)}{1 + pr(0, j-1)}$$

We will also use the notation cost(s, j) cost(s, 0, j).

Bias Assessment

With these quantities defined, we are ready to describe how the illustrated embodiment implements bias assessment. As blocks 32, 34, and 36 indicate, the general approach is to compute values of the attribute (such as unrealized margin) on which the bias to be measured is based, divide the positions into classes (such as winners and losers) in accordance with those attribute values, and compute the bias measure from those groups. The particular attribute on which the classification is based depends on the particular bias of interest.

Sometimes the partitioning is based upon a sort value. For example, unrealized margin can be used as the sort value to define winners as the assets whose unrealized margins are positive and losers are defined as those whose unrealized margins are negative. In that example, there is a fixed threshold, zero, that divides the groups: all positions whose unrealized margins exceed zero fall into the winners group, while those whose unrealized margins are less than zero belong to the losers group.

When the threshold is fixed, the resultant groups' sizes are not always the same. But the system may provide the additional capability of partitioning each group in such a manner that each group has the same weight or number of items. We refer to such groups as "tiles." If this approach is used with unrealized margin as the sort value, partitioning into two tiles would result in one tile containing the items with the lower unrealized margins and a second tile containing the items with the higher unrealized margins.

For some purposes, there may be more than two groups into which the items are to be partitioned. If the groups are not to be tiles in such cases, then more than one threshold is needed.

With the groups having thus been identified, the bias can be calculated. Each bias will be calculated over an analysis period (starting on day j and up to and including day k). The bias will be calculated as the difference between two weighted averages. The items comprising the average are the cross product of day and security. In other words, for each day in the analysis period and for each relevant security there will be one item. (In most analyses, cash will not be considered a relevant security for this purpose, and some analyses may exclude other types of assets as well.) Notionally, the item will be represented as (s, l), where s is the stock and l is the day.

For buys, the illustrated embodiment computes bias as the difference between the groups' weighted averages of the fraction purchased:

$$\text{bias}_{buys} = \frac{\sum_{(s,l) \in I1} fp(s, l) \cdot w(s, l)}{\sum_{(s,l) \in I1} w(s, l)} - \frac{\sum_{(s,l) \in I2} fp(s, l) \cdot w(s, l)}{\sum_{(s,l) \in I2} w(s, l)},$$

where I1 and I2 represent the classes into which the items have been partitioned. For sells, the bias is the difference between the weighted averages of the fraction realized:

$$\text{bias}_{sells} = \frac{\sum_{(s,l) \in I1} fr(s, l) \cdot naw(s, l)}{\sum_{(s,l) \in I1} naw(s, l)} - \frac{\sum_{(s,l) \in I2} fr(s, l) \cdot naw(s, l)}{\sum_{(s,l) \in I2} naw(s, l)}.$$

Although the illustrated embodiment uses weight and no-action weight as the values by which to weight the items, some embodiments may use other weighting schemes; some may be based on cost, for example. Indeed, some may use dollar amounts rather than ratios.

Different embodiments will likely give the user different choices among attributes on which to base the classification. If the purpose is to assess the "gain effect," the attribute of interest is unrealized margin. Some may distinguish among long- and short-term gain effects. For long-term gain effect, the specific unrealized-margin quantity may be the unrealized margin unrealizedMargin(s, 0, l) since portfolio inception, while short-term gain may be some value such as the unrealized margin unrealized margin(s, l-p, l) in the last p days, where typical values of p are 21, 42, and 63.

Examples of attributes that can be used for classification when the bias to be assessed is the "experience effect" are the above-defined realized margin and total margin. This effect, too, can be assessed on both short- and long-term bases.

If the bias to be detected is the age effect, the attribute on which the items are sorted is the asset's age age(s, l).

Another effect for which the system may test is the "momentum effect." In this case, the attribute is "momentum." An asset s's sp-day momentum momentum(s, i, p) on day i is its cumulative return between and including days i and i−p+1:

$$\text{momentum}(s, i, p) = r(s, i-p+1, i)$$

The parameter p determines whether the effect detected is the short- or long-term momentum effect. Typical values for long- and short-term momentum effects are p=252 and p=21, respectively.

A related effect is the "aged-momentum" effect, for which sorting is based on the momentum at the time of purchase. Now, a position may be established over multiple days, so the value for that quantity should be a weighted average of the various purchases' contributions. The fraction purchased fp(s, i) is a convenient value to use for this purpose; on the day after the first purchase, the fraction-purchased value is unity, it is zero on days that follow no purchases, and it is some non-zero fraction on the days that follow subsequent purchases. So asset s's p-day aged momentum on day i can be calculated as follows:

$$agedMomentum(s, i, p) = [1 - fp(s, i)] \cdot agedMomentum(s, i-1, p) + fp(s, i) \cdot momentum(s, i, p).$$

Another effect that some embodiments may be arranged to detect is a bias based on the assets' relative volumes. An asset s's p-day relative volume relativeVolume(s, i, p) on day i is the ratio its dollar volume on day i bears to the average daily dollar volume of s between and including days i−1 and i−p:

$$relativeVolume(s, i, p) = \frac{price(s, i) \cdot volume(s, i)}{\sum_{j=i-p}^{i-1} price(s, j) \cdot volume(s, j)}.$$

The system could similarly base bias detection on an aged version of this quantity:

agedRelativeVolume(s,i,p)=[1−fp(s,i)]·agedRelativeVolume(s,i−1,p)+fp(s,i)·momentum(s,i,p)

Two further examples of attributes that could be used for classification are volatility and aged volatility. The p-day volatility of an asset s on day i is the standard deviation of daily returns for stock s between and including days i−p+1 and i:

$$volatility(s, i, p) = \sqrt{\frac{1}{p-1} \cdot \sum_{j=i-p+1}^{i} (r(s, j) - \overline{r(s)})2},$$

where:

$$\overline{r(s)} = \frac{1}{p} \cdot \sum_{j=i-p+1}^{i} r(s, j),$$

The aged version of that quantity, i.e., the asset's volatility when it was acquired, is given by:

$$agedVolatility(s, i, p) = [1 - fp(s, i)] \cdot agedVolatility(s, i, 1, p) + fp(s, i) \cdot volatility(s, i, p).$$

Of course, sorting can be based on other attributes, too.

Statistical Significance

In addition to calculating the bias measure, some embodiments may additionally give the user an indication of how statistically significant the bias measure is. One approach to providing that indication is to compute the t-Statistic adapted for weighted averages. As defined and published by Goldberg, the t-Statistic for a weighted average is calculated as follows:

$$tStat = \frac{\overline{X} - \overline{Y}}{\sqrt{\frac{\frac{Sx}{\alpha x} + \frac{Sy}{\alpha y}}{n+m-2}} \sqrt{\alpha_x + \alpha_y}}$$

where n is the number of buys in I1 and m is the number of buys in I2, and where:

$$S_x = \sum_{(s,l) \in I1} w(s, l) \cdot (fp(s, l) - \overline{X})^2$$

$$S_y = \sum_{(s,l) \in I2} w(s, l) \cdot (fp(s, l) - \overline{Y})^2$$

$$\alpha_x = \frac{\sum_{(s,l) \in I1} w(s, l)}{n}$$

$$\alpha_y = \frac{\sum_{(s,l) \in I2} w(s, l)}{n}$$

Below are the definitions of terms in the above t-Statistic equation when calculating for buys:

$$\overline{X} = \frac{\sum_{(s,l) \in I1} fp(s, l) \cdot w(s, l)}{\sum_{(s,l) \in I1} w(s, l)}$$

$$\overline{Y} = \frac{\sum_{(s,l) \in I2} fp(s, l) \cdot w(s, l)}{\sum_{(s,l) \in I2} w(s, l)},$$

The definitions for sells are the same, except fp(s, l) is replaced with fr(s, l), and w(s, l) is replaced with naw(s, l).

Such biases and indications of those biases' statistical significance are performance measures, but so are other quantities described above, as are further quantities to be described below. Such quantities include those used as bases for classifying positions to detect bias. So a computer system that embodies the present invention's teachings may give the user the option of having it generate outputs that represent one or more of those quantities, and/or quantities based on them, separately from their use as possible bases for bias. Also, although the illustrated embodiment bases computation of such quantities on weights and weight-based action values, other embodiments may compute them in ways that are separately sensitive to the positions' currency or other-unit values, such as share values. In some embodiments, for example, a portfolio in which every position's value doubles in size despite the absence of any earnings would be considered to have an action in every position, although the illustrated embodiment would find no action in any of those positions.

Impact

Separate from the question of whether the level of detected bias is significant statistically is that of what impact the bias has had on the portfolio. The illustrated embodiment treats certain user inputs as requesting that it present the user some indication of what that impact is. For example, the user may want to know whether the portfolio manager's bias has made the portfolio's returns more or less than they would have been in the absence of that bias. The system may give the results in terms of differences in simple return per dollar of portfolio value, or of something more complicated, such as risk-adjusted return. Or, independently of return, the user may want to know what the effect would be on portfolio risk or on some other figure of merit commonly applied to asset portfolios.

The approach to assessing impact is essentially independent of the bias detected, so no generality will be lost by our concentrating the discussion below on a bias toward buying or selling winners or losers disproportionately. Analysis tools that implement this aspect of the invention will compute the return (or other figure of merit) of a portfolio that is derived from the actual portfolio but has been adjusted to exhibit less bias. (Typically, that lower bias will be equal or near to zero). The bias's impact is then determined from a comparison between that adjusted portfolio's result and either the actual portfolio itself or a portfolio that is derived from that portfolio and exhibits a similar bias.

There may be some variations in approach among embodiments that determine such adjusted portfolios and make comparisons between biased and unbiased portfolios. One approach, for example, is to determine the unbiased portfolio by adjusting the sizes of the actual portfolio's relevant actions. If the impact to be determined is that of a bias toward selling winners, for example, the adjusted portfolio can be the same as the actual portfolio with the exception that the size of each sale of a winner is reduced, and the size of each sale of a loser is increased, to an extent that removes the bias. That portfolio's return could then be compared with the return of the actual portfolio or with the return of a hypothetical portfolio whose assets are the same and are similarly biased.

The illustrated embodiment adopts a different approach, though. Rather than modulate action sizes, the illustrated embodiment adjusts the positions' holding periods. If the portfolio exhibits a bias toward selling winners, for example, the illustrated embodiment's approach is to increase the winners' holding periods and reduce the losers'.

Figure 3:
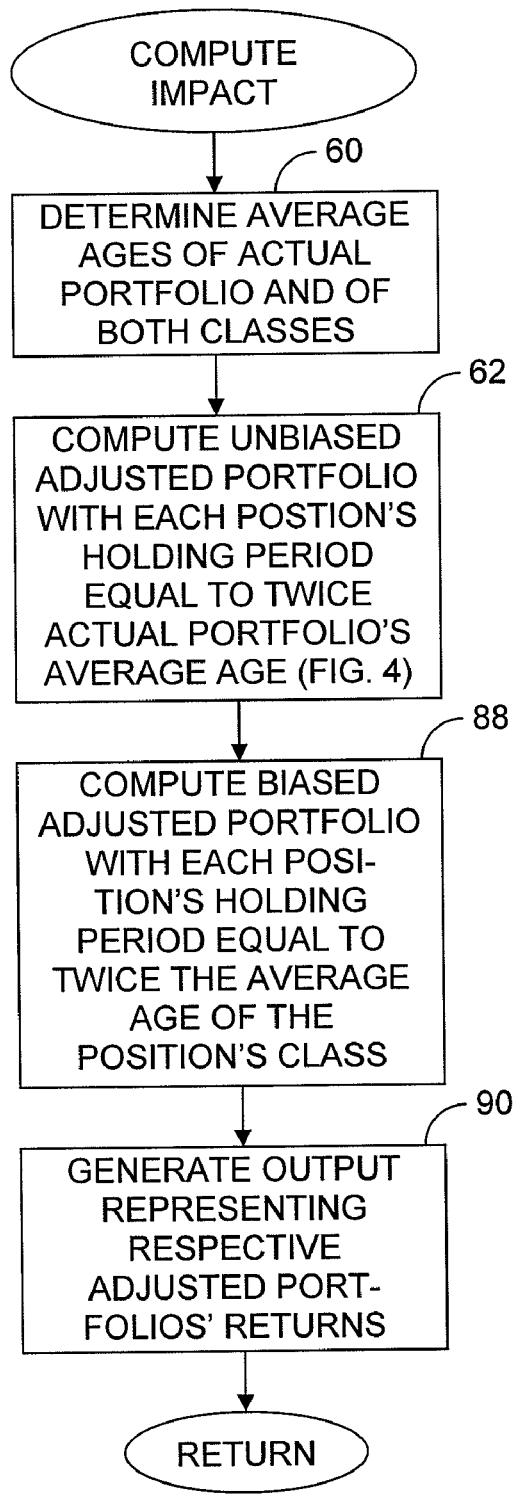
FIG. 3 is a flow chart of a routine for presenting an output indicative of a bias's impact.

FIG. 3 illustrates this approach. That drawing's block 60 represents determining the average ages of the (typically, two) classes that result from classifying the portfolio's positions in accordance with unrealized margin (or some other attribute of interest). Some embodiments may compute the average by weighting various contributions in accordance with position weight. But the quantity that the illustrated embodiment uses in weighting contributions to respective average ages for all winners and for all losers is cost:

$$\text{age}_{I1} = \frac{\sum_{(s,l) \in I1} \text{age}(s, l) \cdot \text{cost}(s, l)}{\sum_{(s,l) \in I1} \text{cost}(s, l)}; \text{age}_{I2} = \frac{\sum_{(s,l) \in I2} \text{age}(s, l) \cdot \text{cost}(s, l)}{\sum_{(s,l) \in I2} \text{cost}(s, l)}$$

As block 60 also indicates, the illustrated embodiment additionally computes not only the respective groups' average ages but also the average age of the portfolio as a whole. The reason for the latter operation is that, rather than comparing the adjusted portfolio's results with those of the actual portfolio, the illustrated embodiment compares it with a hypothetical portfolio in which the positions are the same as those of the actual portfolio but in which the holding periods, as will now be explained, have all been so expanded or reduced that they are approximately the same.

Of course, some embodiments will, as was mentioned above, make the comparison with the actual portfolio's return rather than that of a hypothetical one. But the illustrated embodiment's purpose in generating an impact measure is more to indicate what effect the detected bias tends generally to have than to indicate what it had in the particular time period on which the computation was based, and making all of the positions' holding periods equal tends to eliminate any situation-specific considerations that may have affected the actual portfolio's results. So the illustrated embodiment computes this unbiased adjusted portfolio, as block 62 indicates, in a manner that will in due course be described in connection with FIG. 4.

Figure 4A:
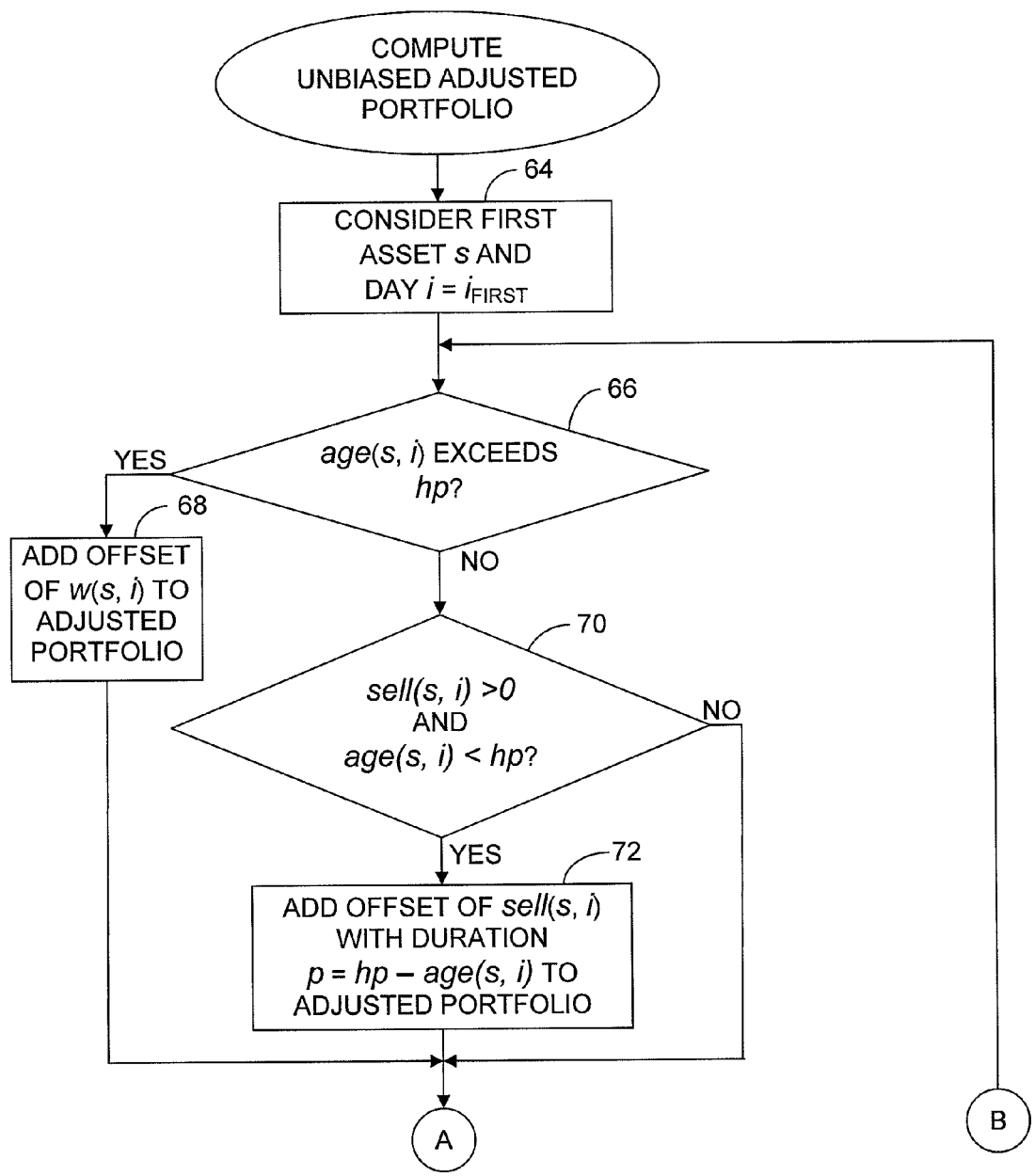
FIGS. 4A and 4B together constitute a flow chart setting forth one of the operations for computing alternative portfolio returns.

Before we consider the FIG. 4 routine, though, we will describe a technique that it uses in arriving at the hypothetical portfolios' returns. In accordance with that technique, it begins with the actual portfolio's return and adjusts it for the effects of certain additional actions. In many cases, these additional actions are intended to cancel actions that occurred in the actual portfolio, and the bulk of the discussion below will be couched in terms of offsets to actions that occurred in the actual portfolio. In the case of some "offsets," though, the purpose may be to cause the alternate portfolio to reflect the results of an action that did not occur in the actual portfolio rather than to offset one that did.

Now, the number of actions to be compensated for at the same time may well be large. Also, the number of different sets of such compensations to be considered concurrently may itself be large, and each of those sets may need to be computed for a large number of days. Moreover, the effect of offsetting a given action interacts with the effects of offsetting all the other actions to be compensated for at the same time, so the complexity of computing such compensation could potentially grow quite fast with the number of compensated-for actions. But the illustrated embodiment employs a way of computing such compensation that scales well; its complexity grows only linearly with the number of actions to be offset.

This approach to computing the alternate portfolio's return for a given day involves performing a sequence of operations, each of which implements an "offset" o. Initially, we will discuss each offset as being associated with a respective action or group of actions that have occurred in the actual portfolio but whose effects the hypothetical portfolio's return should not reflect. The operation that is used to implement a given offset in computing a given day's hypothetical-portfolio return adds that offset's effects to those of other offsets in such a way that each operation's complexity does not depend on the number of actions for which compensation is thereby provided.

One way of carrying out this approach involves computing for each offset o for each relevant day i a respective portfolio-weight value $w(o, i)$ and a corresponding offsetting return value $or(o, i)$ such that the return $r(o, i)$ that the actual portfolio would have had in the absence of the actions to be offset by operation o equals the sum of that offsetting return and the product of that weight and the actual return:

$$r(o,i) = or(o,i) + w(o,i) \cdot pr(i).$$

(Note that here we are overloading the function name w: $w(o, i)$, in which the first argument is of the offset-operation type, returns a portfolio weight, whereas w(s, i), in which the first argument is of the asset type, returns the weight of an asset in a portfolio.)

It will sometimes be convenient to think of the offsetting return value or(o, i) as the result of complementarily weighting the return d(o, i) of a hypothetical offset portfolio, in which case the expression for the adjusted portfolio's return becomes:

$$r(o,i) = w(o,i) \cdot pr(i) + [1-w(o,i)] \cdot d(o,i),$$

where, if the offset o offsets only a single action, on an asset s, d(o, i) is the return of a portfolio 100% invested in s: d(o, i)=r(s, i). For an offset of a set of actions, d(o, i) could be derived, in a manner that will be explained below, from the returns of the assets on which the actions in the set occurred.

The advantage of this incremental-computation approach is, as will shortly be seen, that the complexity of adding an offset for a given action to that of other actions is independent of the number of other actions; without using any quantity specific to any action $a_1, a_2, \ldots,$ or $a_{N-1}$, the weight and offset-return-contribution values for an offset that compensates for actions $a_1, a_2, \ldots, a_N$ can be computed simply from the corresponding two values for the offset that compensates for actions $a_1, a_2, \ldots,$ and $a_{N-1}$. As will also be seen below, the turnover that would be required if the adjusted portfolio were actually to be implemented can be computed in a similarly incremental and scalable manner.

To explain how we arrive at a weight value w(o, i) that implements this approach appropriately, we start by considering how to offset a single buy action that has occurred in the actual portfolio. We assume that the buy action occurs on day i−1, and we will determine the value w(o, i) that the weight assumes on day i. Once that value has been determined, the weight value on each subsequent day j, which will increase or decrease in accordance with the actual and substitute portfolios' relative performances, can be determined from the previous day's weight:

$$w(o, j) = w(o, j-1) \cdot \frac{1 + pr(j-1)}{1 + r(o, j-1)}.$$

From the second equation above for r(o, i) and the fact its "difference" value d(o, i) in the case of a single buy action on a position s is that position's return r(s, i), it is apparent that, to roll back the effect of the buy, the weight factor 1−w(o, i) by which position s's return is multiplied must be negative: the hypothetical alternate portfolio must have a short position in that asset. In the case of a buy, therefore, w(o, i) must be some value greater than one.

To determine just what that value should be, it is important first to consider precisely what the nature is of the "actions" that we defined above. To this end consider a portfolio whose holdings are limited to positions in assets x, y, and z, and let us suppose that the position in x ends up with a weight of 40% rather than its no-action weight of 20%: it had a 20% action (which we refer to as a "buy"). Now, that 20% of weight could have all come from the position in y, it could have all come from the position in z, or it could have come in some proportion from both. When we offset that buy, though, we want to arrive at the offset quantities in a way that is independent of where the funds to make the buy came from. So, as we will demonstrate presently, we model a buy as a purchase made with funds that come from outside the portfolio, i.e., as an infusion of finds into the portfolio. We similarly model a sell as a (complete or partial) liquidation of a position and a withdrawal of the liquidation proceeds from the find.

This can be comprehended best by venturing briefly into the dollar domain. Consider the portfolio as having a value of $100 at the start of the day after the buy. According to our model, the 20% action in x means that the x position resulted from adding $20 to that position. And, although the finds for adding to that position may have been generated by liquidating other positions, we model the buy as those finds' having come from outside the portfolio. We do this because the liquidations of other positions are themselves actions, and we are interested here in offsetting only the position-x action, not in offsetting the others. So, to offset the x-position action by itself, we take $20 out of the x position—changing it to $20—without adding that $20 to any of the other positions. In the dollar domain, that is, offsetting that buy without offsetting any other actions results in the x position's having a value of $40−$20=$20 out of a total portfolio value of $100−$20=$80.

We now return to the weight domain and observe that the offset's result is a position-x weight of ($40−$20)/($100−$20)=25%. More generally, that is, the day-i weight w'(s, i) of position s in the portfolio that results from offsetting a day-i−1 action action(s, i−1) on a position in asset s is given by $$w(s, i) = \frac{w(s, i) - \text{action}(s, i-1)}{1 - \text{action}(s, i-1)}.$$

Now, recall our assumption that the adjusted portfolio in which asset s has this weight results from two components. One of those components is the actual portfolio weighted by the weight value w(o, i) that we are seeking. The other is an offset portfolio weighted by 1−w(o, i). Also recall that position s's weight in the actual portfolio is w(s, i) and that its weight in the offset portfolio it is 100% (in the case of a single-action offset). We can conclude from these facts that another expression for asset s's weight w'(s, i) in the adjusted portfolio is:

$$w'(s,i) = w(o,i) \cdot w(s,i) + [1-w(o,i)] \cdot 1.0.$$

By solving for w(o, i) in the equation that results from equating the previous two equations' expressions for w'(s, i), we obtain the following value for the weight w(o, i) we are seeking:

$$w(o, i) = \frac{1}{1 - \text{action}(s, i-1)},$$

As we stated above, that value is the actual-portfolio weight in our equation r(o, i)=w(o, i)·pr(i)+ or(o, i) for the day-i return of the adjusted portfolio that results from an offset o of a single action that occurred on day i−1. If offset o offsets only a single-action, in asset s, then $$or(o,i) = [1-w(o,i)] \cdot r(s,i).$$

As was mentioned above, the values that we have just determined are those for the day after the action being offset. Values for subsequent days are similar, but the weights are adjusted for relative returns:

$$w(o, j) = w(o, j-1) \frac{1 + pr(j-1)}{1 + r(o, j-1)}.$$

We now turn to how quantities determined in the manner described above can be combined to arrive at an adjusted portfolio that contains compensation for multiple actions. We will assume, that is, that there are offsets o1 and o2 for which we have already determined respective offset return contributions or(o1, i) and or(o2, i) and respective portfolio weights w(o1, i) and w(o2, i). Although we have so far demonstrated only how to obtain these quantities for offsets of single actions, it will become apparent that the following explanation applies equally to cases in which one or both offsets o1 and o2 provide compensation for multiple-action sets.

What we want is a way to obtain from these values the return r(o3, i) of the adjusted portfolio that results from an offset o3 for the union of o1's and o2's respective action sets. Our approach to doing so will be to postulate that this portfolio's return can be computed, just as a single-action offset can, as the weighted sum of the actual portfolio's return and some offset return, which in this case we will refer to as or(o3, i). We will postulate, that is, that:

$$r(o3,i) = w(o3,i) \cdot pr(i) + or(o3,i),$$

and we will further postulate that or(o3, i) is some weighted sum of or(o1, i) and or(o2, i). What remains is to find expressions for w(o3, i) and or(o3, i).

Now, in accordance with our assumption, the actual portfolio return's contribution to the adjusted portfolio's return will be w(o3, i)·pr(i). We know that or(o1, i) and or(o2, i) are the quantities that, when added to the quantities w(o1, i)·pr(i) and w(o2, i)·pr(i), respectively, compensate in the above-defined manner for the effects of their respective action sets in those quantities. So the values required to compensate for those action sets' effects in w(o3, i)·pr(i) must be or(o1, i)·[w(o3, i)/w(o1, i)] and or(o2, i)·[w(o3, i)/w(o2, i)], respectively, i.e.:

$$r(o3, i) = w(o3, i) \cdot pr(i) + \frac{w(o3, i)}{w(o1, i)} \cdot or(o1, i) + \frac{w(o3, i)}{w(o2, i)} \cdot or(o2, i)$$

Since we have assumed that we already know the constituent offset returns and weights or(o1, i), or(o2, i), w(o1, i), and w(o2, i), that equation can be used to compute the desired adjusted-portfolio return once we know what w(o3, i) is. And, from the fact that the weights need to add to 100%, i.e., that $$w(o3, i) + \frac{w(o3, i)}{w(o1, i)} + \frac{w(o3, i)}{w(o2, i)} = 1,$$

we can conclude that $$w(o3, i) = \frac{w(o1, i) \cdot w(o2, i)}{w(o1, i) + w(o2, i) - w(o1, i) \cdot w(o2, i)}.$$

To demonstrate how this works, let us assume that the day-i weights of the asset-x, asset-y, and asset z positions in our three-position portfolio are respectively 40%, 40%, and 20% and result from day-i−1 actions of +20%, 0%, and −20%, respectively. If we refer to the offsets for the actions in those three positions as oX, oY, and oZ, respectively, then:

$$w(oX,i)=125\%; \; or(oX,i)=-0.25 \cdot r(x,i)$$

$$w(oY,i)=100\%; \; or(oY,i)=0 \cdot r(y,i)$$

$$w(oZ,i)=83\%; \; or(oZ,i)=0.17 \cdot r(z,i)$$

Since there was no action in the asset-y position, an adjusted portfolio whose weights are all the no-action weights should result from combining the individual-position offsets oX and oZ. To show that such an adjusted portfolio does result, we note that the above equation for the combined offset oXZ's portfolio weight gives w(oXZ, i)=100%. Using this value and the other weight values above after substituting oX, oZ, and oXZ for o1, o2, and o3, respectively, in the above equation for the return r(o3, i) of a portfolio adjusted for two constituent offsets yields:

$$r(oXZ,i)=1.00 \cdot pr(i)+0.8 \cdot or(ox,i)+1.2 \cdot or(oZ,i)$$

Then substituting for the or values yields:

$$r(oXZ,i)=1.00 \cdot pr(i)-0.2 \cdot r(x,i)+0.2 \cdot r(z,i)$$

And, noting that the actual portfolio's weights are 40%, 40%, and 20%, we can substitute 0.4·r(x, i)+0.4·r(y, i)+0.2·r(z, i) into for the actual-portfolio return pr(i) to obtain:

$$r(oXZ,i)=0.2 \cdot r(x,i)+0.4 \cdot r(y,i)+0.4 \cdot r(y,i),$$

i.e., the return of a portfolio whose positions have the actual portfolio's no-action weights, namely, 20%, 40%, and 40%. In short, combining offsets for all of a day's actions results in an all-no-action-weight portfolio, even though implementing an offset for a single action does not by itself always return the position in which the action occurred to its no-action weight.

Now, recall that we described an offset o's offset return contribution or(o, i) as the value such that the return r(o, i) of the portfolio that results from adjusting for offset o's actions is given by:

$$r(o,i) = w(o,i) \cdot pr(i) + or(o,i).$$

From this equation and the above equation for the adjusted portfolio's return r(o3, i), it is apparent that the computation of r(o3, i) can conveniently be computed in such a manner as to produce or(o3, i)

$$or(o3, i) = \frac{w(o3, i)}{w(o1, i)} \cdot or(o1, i) + \frac{w(o3, i)}{w(o2, i)} \cdot or(o2, i)$$

as an intermediate result. By simply retaining this value and that of weight w(o3, i), it is possible to combine r(o3, i) with another offset's corresponding quantities to find the return of a portfolio adjusted for a superset the actions that o3 offsets. So computing the return that results from rolling back n actions is a problem of only O(n) complexity.

Now, it is also sometimes valuable to know whether the adjustments being made would result in a portfolio whose turnover is greater or less than the actual portfolio's. Therefore, some embodiments will also keep track of the change inc(o, k) in turnover that a given offset causes. In the case of an offset o for a sell in asset s on day i, that change day i is that sell's value:

$$inc(o,i) = -\text{sell}(s,i).$$

On subsequent days, it is given by $$inc(o,i) = \text{scaleUp}(\text{sell}(s,i), s, i, i+p)$$

where scaleUp(a, s, i, j) is the value of the action that would have to be taken in asset s's position on day j to give that position's day-j weight the value it would have if an action of value a had occurred on day i:

$$\text{scaleUp}(a, s, i, j) = a \cdot \frac{1 + r(s, i, j)}{1 + (1-a) \cdot pr(i, j) + a \cdot r(s, i, j)}.$$

When offsets are combined, the turnover increments simply add:

$$inc(o3,i) = inc(o1,i) + inc(o2,i)$$

Having now described an advantageous approach to computing adjusted returns, we return to the operation that FIG. 3's block 62 represents and that FIG. 4 depicts in more detail. As FIG. 4's Block 64 indicates, the illustrated embodiment begins with the value of the first asset on the first day in the interval for which the computations are to be made, and, as block 66 indicates, it compares the position's age with a target holding period for the adjusted portfolio as a whole. In order to arrive at an adjusted portfolio in which the average age is the same as the actual portfolio's, this target holding period is set to be twice the portfolio's average age, which in the illustrated embodiment is computed as set forth above. As block 68 indicates, the routine so adjusts the hypothetical portfolio's day-i return as to offset that position if asset s's age exceeds the target holding period.

Now, rather than an offset of the type described above, which is used to offset an action and typically affects the hypothetical portfolio's return for more than one day, the type of offset applied here is for a position and affects only the return of a single day. The discussion above of how to combine offsets remains valid, but the portfolio-weight value is determined from the position weight rather that the action. Consequently, we can represent the resultant determinations of the actual portfolio weight w(o, k) and the offset-portfolio return d(o, k) used in arriving at the adjusted portfolio results for any given day k as follows:

That is, the only day k for which this offset affects the adjusted portfolio's results is day k=i+1. And, in the simple turnover measure we are assuming for the illustrated embodiment, this offset has no effect on that measure:

$$inc(o,k) = 0 \text{ for all } k$$

For a buy-and-hold position, a similar single-day offset for asset s will be implemented for each subsequent day as the routine loops through those days, and the resultant string of single-day offsets has the same effect as selling the position on the first day in which its age in the actual portfolio exceeds the target holding period; i.e., the same effect could be obtained by an action offset. At least for positions in which multiple buys have occurred, though, we consider using multiple position offsets to be more convenient.

If the result of the block-66 determination is instead that the position's age does not exceed the target holding period, then the position should not be offset. As block 70 indicates, though, the routine in that case determines whether a sell action in that position occurred on the day in question. Now, the equation set forth above for determining a position's age indicates that a partial sale of a position that was acquired over a plurality of days is treated as though assets from each of the buys that contributed to the position are being sold proportionately. To a degree, this convention is arbitrary, and other embodiments may treat such sales differently for age-determination purposes; first-in, first-out or last-in, first-out approaches may be taken, for instance. But the example approach is convenient, because it results in an age quantity that a sell does not affect, and, as block 70's negative branch indicates, no operation to adjust the hypothetical portfolio has to be taken in response to a sale of a position whose age exceeds the target holding period.

If the target position's age is less than the target holding period, though, the hypothetical portfolio should not have a sell in that position. So, if the actual portfolio does have a sell in that case, the routine applies an action offset whose effects extend for the number of days p by which the intended holding period exceeds the position's age on the day currently under consideration. That is, block 72 represents making adjustments for each day's hypothetical-portfolio return from the day i under consideration to day i+p. The following quantities characterize such an offset:

$$d(o, k) = \begin{cases} 0 & \text{for } k \leq i \\ r(s, k) & \text{for } k = i+1 \\ 0 & \text{for } k > i+1 \end{cases}$$

$$w(o, k) = \begin{cases} 1 & \\ 1 + \frac{w(s, i+1)}{1 - w(s, i+1)} & \text{if age}(s, i) < \text{holdingPeriod} \\ 1 & \text{otherwise} \\ 1 & \end{cases} \begin{cases} \text{for } k \leq i \\ \text{for } k = i+1 \\ \text{for } k > i \end{cases}$$

$$d(o,k) = \begin{cases} 0 & \text{for } k <= i \\ r(s,k) & \text{for } k = i+1, i+2, \ldots, i+p \\ 0 & \text{for } k > i+p \end{cases}$$

$$w(o,k) = \begin{cases} 1 & \text{for } k <= i \\ 1 - \dfrac{\text{sell}(s,i)}{1+\text{sell}(s,i)} & \text{for } k = i+1 \\ w(o,k-1) \cdot \dfrac{1+pr(k-1)}{1+r(o,k-1)} & \text{for } k = i+2, \ldots, i+p \\ 1 & \text{for } k > i+p \end{cases}$$

$$inc(o,k) = \begin{cases} -\text{sell}(s,i) & \text{for } k = i \\ scaleUp(\text{sell}(s,i), s, i, i+p) & \text{for } k = i+p \\ 0 & \text{for all other } k \end{cases}.$$

As blocks 74 and 76 indicate, FIG. 4's item-processing loop for the current day is repeated for every position. And, as blocks 82, 84, and 86 indicate, this operation of adding offsets is repeated for each day i.

Now, the block-68 and block 72 operations of "adding offsets" may in some embodiments include actually computing the hypothetical-portfolio returns r(o, i) for each offset. But this is not necessary for all purposes, so those steps may in other embodiments involve computing only the weights w(o, i) and offset returns or(o, i). Such embodiments would require a further operation, represented by block 84, in which each day's return is computed from the actual return for that day by using the offset return and weight of the last-computed offset for that day.

This completes the FIG. 4 routine and thus the operation of FIG. 3's block-62 step. With the block-62 operation of computing the unbiased adjusted portfolio thus completed, the FIG. 3 routine turns to performing a similar operation for the biased adjusted portfolio, as block 88 indicates. This operation is the same as the one just described in connection FIG. 4 for the unbiased adjusted portfolio, with the exception that two different holding periods are applied; one for winners and another for losers. Specifically, if unrealizedMargin(s, k) exceeds zero (or the tiling threshold), the portfolio's position in asset s on day k is considered a winner, and the holding period used in the operations that FIG. 4's Blocks 66, 70, and 72 represent equals twice that of the winner-position average over the interval of interest as whole. If the unrealizedMargin (s, k) value is instead less than zero (or the tiling threshold), then that holding period is instead the one determined for the loser positions.

Note here that a given position can be both a winner and a loser at different times throughout the interval of interest and that the equation given above for average age reflects this.

Specifically, there is not just a single contribution to the average-age quantity for each portfolio position; instead, there is a separate contribution for each combination of position and day. So contributions for a given position can be made to the winner group's average age for some days and to the loser group's average age for other days.

With the different portfolios' returns thus determined, the system generates an output, as block 90 indicates, that represents the return comparison. That output may merely set forth the different portfolios' returns, or it could produce an output that is determined by them, such as their difference, ratio, etc.

Outputs that compare the returns on a risk-adjusted basis are particularly helpful. Numerous ways of adjusting returns for risk are known to those skilled in the art, as is evidenced by papers such as "Understanding Risk and Return, the CAPM and the FamaFrench Three-Factor Model" by Adam Borchert, Lisa Ensz, Joep Knijn, Greg Pope and Aaron Smith, Tuck School of Business at Dartmouth (Dartmouth College), Case Note 03-111 (2003), which describes the CAPM and the three-factor model. Various embodiments may use such approaches, one that results from adding a momentum factor to the three-factor model and/or others to generate outputs based on the impact calculations.

Now, the hypothetical adjusted portfolio that results from treating a given asset as a winner on some days and a loser on others can in some cases be one in which that asset is bought and sold more frequently than is realistic. If the holding period for winners is 400 days and the period for losers is 500 days, for instance, then a given position whose unrealized margin waivers around zero during the interval in which its age increases from 400 day to 500 days will be represented in the hypothetical portfolio as being bought and sold many times during that 100 days. Although this is not realistic behavior for an actual portfolio, it actually serves the adjusted portfolio's purpose well. It yields a result that is a weighted average of winner and loser results in proportion to the degree to which the position exhibited winner and loser behavior.

Note that the hypothetical portfolio's buy-action dates are the same as those of the actual portfolio in the above approach; it is the effective sell-action dates that change. Although we prefer this approach, other embodiments of the invention may not follow that rule. For example, equal holding periods can be achieved by instead advancing buy actions and keeping the sell-action dates the same or by various combinations of advancing or delaying buy actions and advancing or delaying sell actions in combinations that may be different for different classes.

The offset quantities that may be used to advance a sale rather than delay it are given by:

$$d(o,k) = \begin{cases} 0 & \text{for } k <= i-p \\ r(s,k) & \text{for } k = i-p+1, i-p+2, \ldots, i \\ 0 & \text{for } k > i \end{cases}$$

$$w(o,k) = \begin{cases} 1 & \text{for } k <= i-p \\ 1 + \dfrac{scaleBack(\text{sell}(s,i), s, i-p, i)}{1 - scaleBack(\text{sell}(s,i), s, i-p, i)} & \text{for } k = i-p+1 \\ w(o,k-1) \cdot \dfrac{1+pr(k-1)}{1+r(o,k-1)} & \text{for } k = i-p+2, \ldots, i \\ 1 & \text{for } k > i \end{cases}$$

$$inc(o, k) = \begin{cases} scaleBack(\text{sell}(s, i), s, i-p, i) & \text{for } k = i-p \\ -\text{sell}(s, i) & \text{for } k = i \\ 0 & \text{for all other } k \end{cases}$$

where scaleBack(a, s, i, j) is the value of the action that would have had to be taken in asset s's position on day i to give that position's weight on day j the value that an action of value a on day j would cause:

$$scaleBack(a, s, i, j) = a \cdot \frac{1 + pr(i, j)}{1 + r(s, i, j)}.$$

Examples of quantities that can be used for delaying a buy are:

$$d(o, k) = \begin{cases} 0 & \text{for } k <= i \\ r(s, k) & \text{for } k = i+1, i+2, \ldots, i+p \\ 0 & \text{for } k > i+p \end{cases}$$

$$w(o, k) = \begin{cases} 1 & \text{for } k <= i \\ 1 + \dfrac{\text{buy}(s, i)}{1 - \text{buy}(s, i)} & \text{for } k = i+1 \\ w(o, k-1) \cdot \dfrac{1 + pr(k-1)}{1 + r(o, k-1)} & \text{for } k = i+2, \ldots, i+p \\ 1 & \text{for } k > i+p \end{cases}$$

$inc(o, k) = 0$ for all $k$

And the quantities for advancing a buy are:

$$d(o, k) = \begin{cases} 0 & \text{for } k <= i-p \\ r(s, k) & \text{for } k = i-p+1, i-p+2, \ldots, i \\ 0 & \text{for } k > i \end{cases}$$

$$w(o, k) = \begin{cases} 1 & \text{for } k <= i-p \\ 1 - \dfrac{\text{buy}(s, i)}{1 + \text{buy}(s, i)} & \text{for } k = i-p+1 \\ w(o, k-1) \cdot \dfrac{1 + pr(k-1)}{1 + r(o, k-1)} & \text{for } k = i-p+2, \ldots, i \\ 1 & \text{for } k > i \end{cases}$$

$inc(o, k) = 0$ for all $k$

Note that these example delaying and advancing equations treat sells and buys differently. The buy treatment is based on the assumption that the manager wants to add some predetermined additional weight in that position, and this weight increment is preserved when the buy is advanced or delayed: the same weight is bought p days earlier. In contrast, the sell treatment is based on the assumption that the decision is to sell some proportion of the position itself, and this is what is preserved.

Of course, some embodiments' advancing and delaying approaches may be based on different assumptions. Even with these assumptions, moreover, the above equations result in something of an approximation. Since buys are not scaled when they are advanced, for example, there is a residual gain or loss for which the equations above do not account.

This can be appreciated by considering the case of advancing a buy of 50 basis points ("bps") by one month. Suppose that the manager holds this position for a year. Advancing that buy will likely result in a position that is not exactly 50 bps at the time of the original purchase. Suppose, in fact, that the position grew to 60 bps by the time of the original purchase. To model this effect, the additional 10 bps (60 bps–50 bps) needs to be carried forward until the original sell date. And, at the original sell date, the additional carried amount of 10 bps, which may have increased or decreased with respect to the portfolio, needs to be sold. Selling this carry-over will result in additional turnover for the adjusted portfolio. There is also a (much smaller) carry-over for sells. So some embodiments may include provisions for reflecting them, but our experience is that any increased accuracy is too small to justify the added computation.

As was mentioned above, another way to modulate actions is to change their relative sizes. The following quantities can be used to implement offsets for this purpose:

$$d(o, k) = \begin{cases} 0 & \text{for } k <= i \\ r(s, k) & \text{for } k = i+1, i+2, \ldots, i+\text{life}(s, i) \\ 0 & \text{for } k > i+\text{life}(s, i) \end{cases}$$

$$w(o, k) = \begin{cases} 1 & \text{for } k <= i \\ 1 - \dfrac{\text{buy}(s, i) \cdot (\text{factor} - 1)}{1 - \text{buy}(s, i) \cdot (\text{factor} - 1)} & \text{for } k = i+1 \\ w(o, k-1) \cdot \dfrac{1 + pr(k-1)}{1 + r(o, k-1)} & \text{for } k = i+2, \ldots, i+\text{life}(s, i) \\ 1 & \text{for } k > i+\text{life}(s, i) \end{cases}$$

$$inc(o, k) = \begin{cases} scaleUp(\text{buy}(s, i) \cdot (\text{factor} - 1), s, i, i+\text{life}(s, i)) & \text{for } k = i+\text{life}(s, i) \\ 0 & \text{for all other } k \end{cases}$$

where factor is the ratio of the hypothetical portfolio's action to the corresponding actual-portfolio action.

Outputs

It is anticipated that most systems that implement the present invention's teachings will afford users the capability of choosing among many different outputs representing many different quantities. Suppose, for example, that the user is interested in analyzing a portfolio for the gain effect. The system may give such a user the option not only of choosing that effect but also of specifying whether that effect is to be explored in sells or buys and whether the basis for comparison will be tiles or will instead be "splits" based on a predetermined threshold.

Figures 4B, 5:
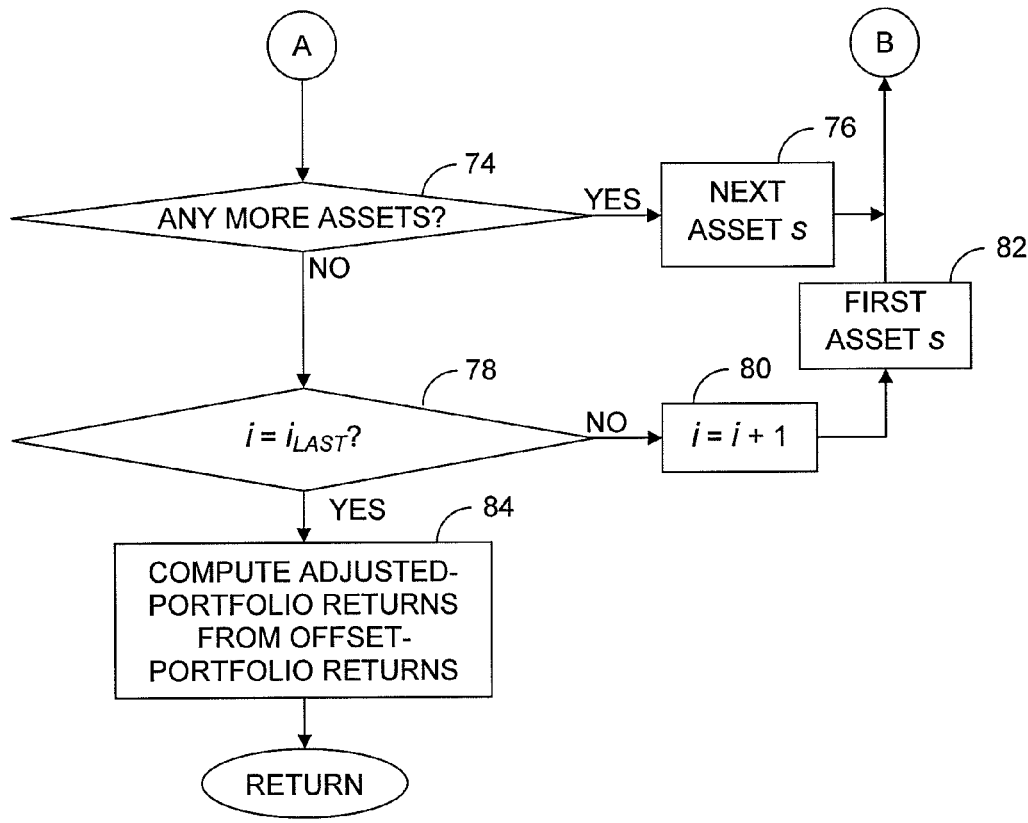
FIG. 5 depicts one of the illustrated embodiment's output displays that results from bias assessment.

And one type of resultant output that the system could present may be a list of statistics such as the one that FIG. 5 depicts. As the "weight" row indicates, the system has used equal-weight tiles as the basis for comparison and has computed respective values of turnover, age, margin, and contribution for each tile. If the system had instead based its classification on predetermined-threshold splits, those weights would typically differ. The FIG. 5 output also displays not only a resultant bias-measure value but also its T-statistic and, as example measures of bias impact, the differences between the two tiles' returns and alphas.

Figure 6:
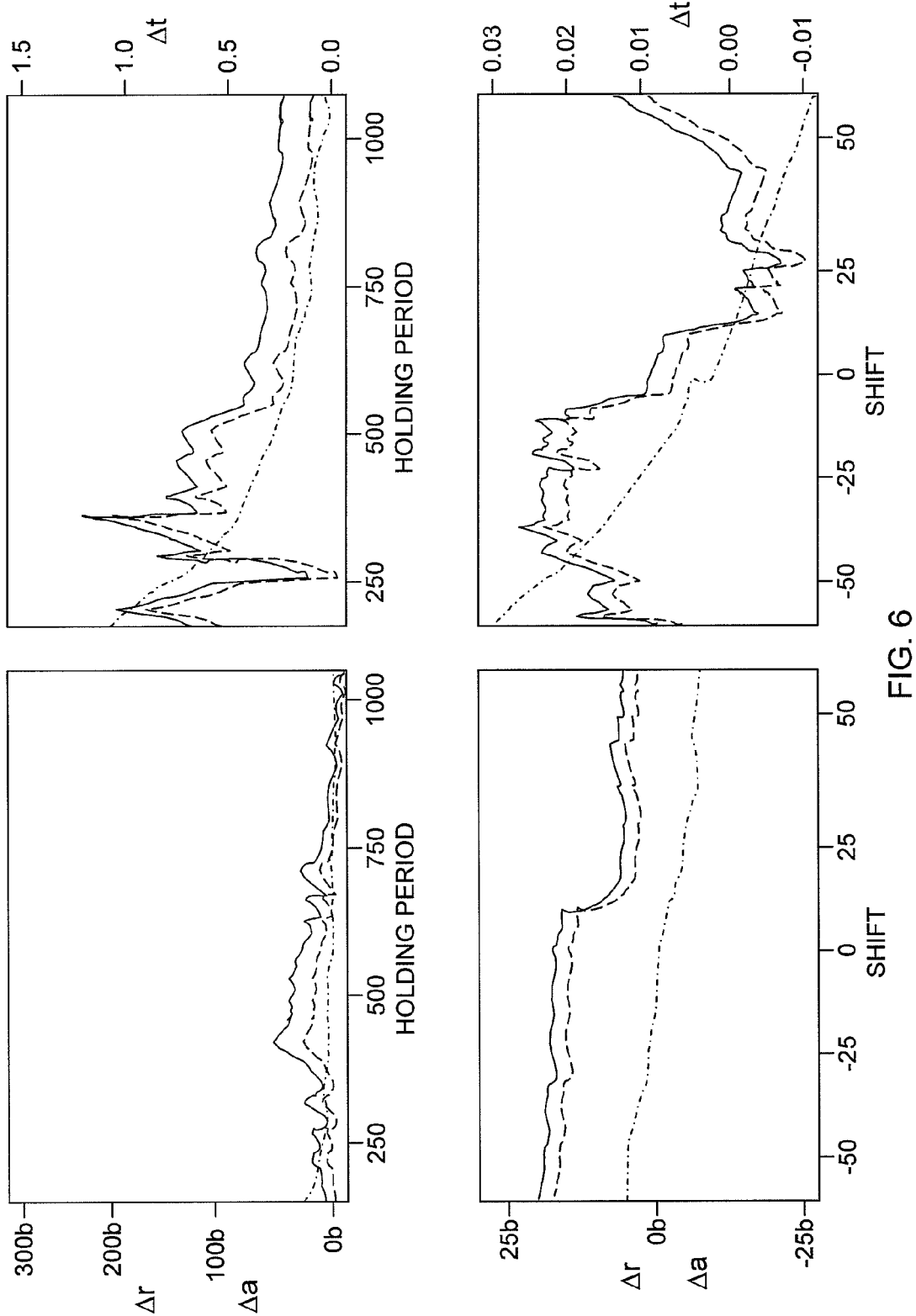
FIG. 6 depicts another of the illustrated embodiment's output displays that results from bias assessment.

The system may additionally or instead present results in graphical form. FIG. 6 depicts an example. There the system has treated two tiles of one actual portfolio as respective individual active portfolios. For each tile it has determined performance-measure values for a plurality of hypothetical portfolios. Each hypothetical portfolio is associated with a different target holding period, and its positions are obtained by so modulating that tile's positions that those positions all have the associated holding period. The upper-left graph plots those performance measures against holding period for the portfolios obtained by modulating one tile's positions, and the upper-right graph plots those measures for hypothetical portfolios similarly obtained from the other tile's. The example performance measures are the differences in return, alpha, and turnover between those hypothetical portfolios and either the actual portfolio itself or another hypothetical portfolio, whose holding periods are uniform but have an average that equals that of the actual portfolio.

FIG. 6's lower graphs are similarly associated with respective tiles, but the hypothetical portfolios there have resulted from time-shifting actions of a selected type.

Assessing Advantage

Similar plots can be used to provide an indication of what we refer to as the portfolio manager's buying or selling "advantage." The portfolio manager typically holds different positions for different lengths of time, presumably to add value. These advantage values are a way of measuring the degree to which the portfolio manager has achieved this end. The illustrated embodiment calculates two types of buying and selling advantage: the return-based type and the alpha-based type. Some observation interval is defined, and the actual portfolio's average holding period over that interval is determined. The return- and alpha-type buying averages are respectively the return and alpha of a hypothetical portfolio whose positions have a uniform holding period equal to that average. The return- and alpha-type selling averages are respectively the differences between the return- and alpha-type buying advantages and the actual portfolio's return and alpha.

Figure 7:
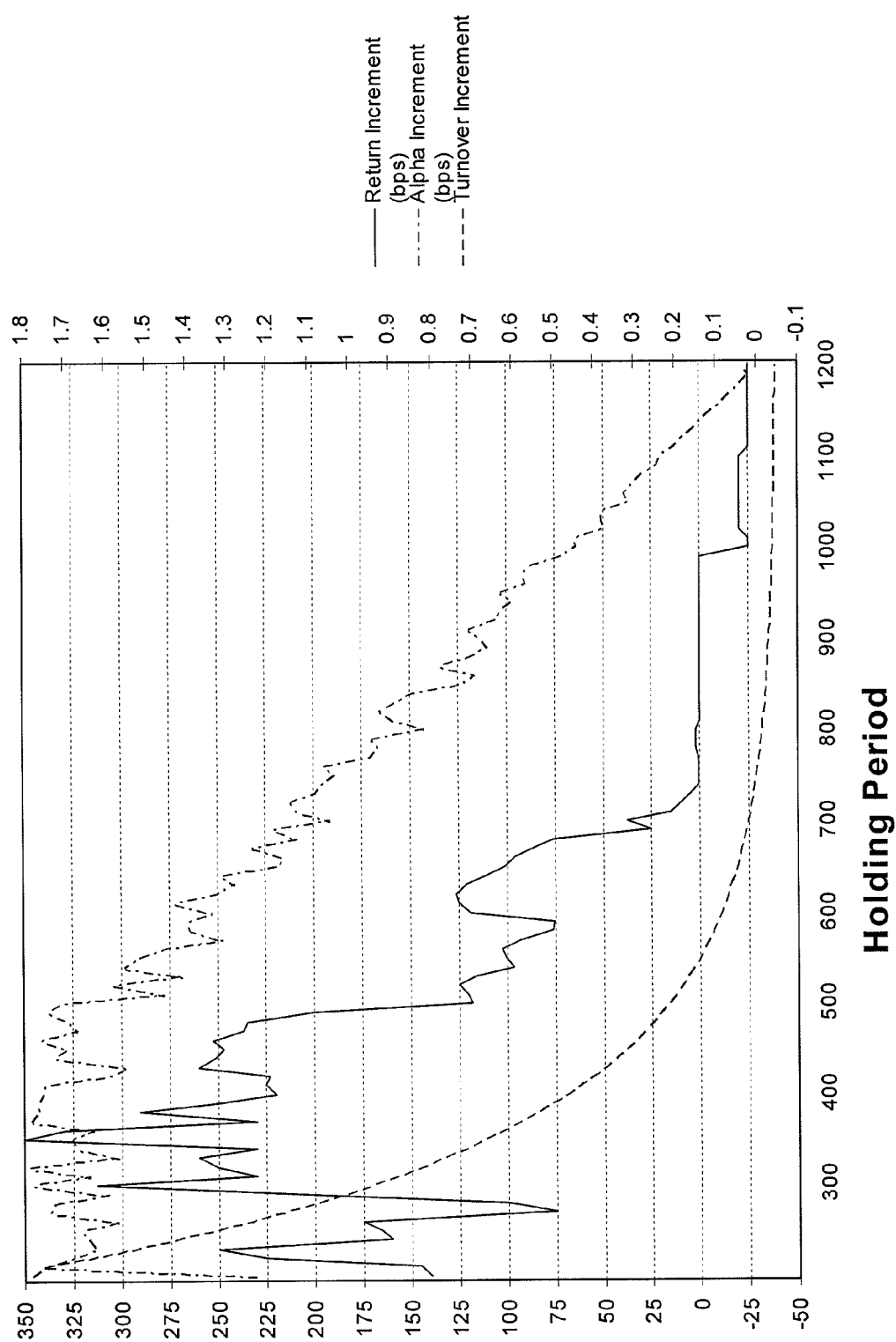
FIG. 7 is one of the illustrated embodiment's output displays that results from an assessment of timing advantage.

Such values may be presented by themselves or with other values. For example, the system may compare the actual portfolio's returns, alphas, and turnovers with those of a variety of hypothetical portfolios, each of which is associated with a different holding period, for which all of that hypothetical portfolio's positions are held, and it may display those values to the user in a display of a type exemplified by FIG. 7. In that drawing, the differences in return, alpha, and turnover between the actual portfolio and hypothetical portfolios having the same positions but different respective uniform holding periods are plotted against the holding period associated with the hypothetical portfolio.

Accounting for Corporate Actions

The concepts of return and realization were left undefined above. This is appropriate, because their precise definitions are not critical to the present invention's teachings, and there will likely be some variation in which various embodiments treat them. For the sake of example, though, we will set forth one approach to treating return's various components.

In this approach, the equations for no-action weight, fraction unrealized, and unrealized contribution are modified for spin-offs and special dividends, as will be explained below, in such a manner that a change in position weight that results from such a corporate action should not be interpreted as a sale but should be considered a realization. To give the modified equations, we introduce the following quantities, which represent market data typically obtained separately from the portfolio data:

price(s,i) is asset s's price at close of day i.
incomeAmount(s,i) is asset s's ordinary dividend with ex-day of i.
eventAmount(s,i) is asset s's special dividend or proceeds from spin-off on ex-day i.
splitFactor(s,i) is asset s's split factor on ex-day i.

The equations below allocate stock return and contribution into three parts: for price changes, for ordinary dividends, and for corporate actions (such as spin-offs and special dividends).

Asset s's return rfp(s, i) from (split-adjusted) price from the close on day i−1 to the close on day i is given by:

$$rfp(s, i) = \frac{\text{price}(s, i) \cdot \text{splitFactor}(s, i) - \text{price}(s, i-1)}{\text{price}(i-1)}$$

Asset s's return rfi(s, i) from income from the close on day i−1 to the close on day i is given by:

$$rfi(s, i) = \frac{\text{incomeAmounts}(s, i)}{\text{price}(i-1)}$$

Asset s's return rfe(s, i) from spin-offs, special dividends, etc. from the close on day i−1 to the close on day i is given by:

$$rfe(s, i) = \frac{\text{eventAmount}(s, i)}{\text{price}(i-1)}$$

Asset s's total return r (s, i) from spin-offs, special dividends, etc. from the close on day i−1 to the close on day i is given by:

$$r(s,i) = rfp(s,i) + rfi(s,i) + rfe(s,i).$$

Asset s's contribution cfp(s, i) from changes in price on day i is given by:

$$cfp(s,i) = w(s,i) \cdot rfp(s,i)$$

Asset s's contribution cfi(s, i) from ordinary dividends on day i is given by:

$$cfi(s,i) = w(s,i) \cdot rfi(s,i)$$

Asset s's contribution cfe(s, i) from special dividends and spin-offs on day i is given by:

$$cfe(s,i) = w(s,i) \cdot rfe(s,i)$$

Asset s's total contribution c(s, i) on day i is given by:

$$c(s,i) = cfp(s,i) + cfi(s,i) + cfe(s,i)$$

Asset s's contribution cfpe(s, i) on day i excluding ordinary dividends is given by:

$$cfpe(s,i) = cfp(s,i) + cfe(s,i)$$

Below are no-action-weight, fraction-unrealized, and unrealized-contribution equations that reflect this treatment of spin-offs and special dividends:

$$naw(s, i) = \frac{1 + rfp(s, i-1)}{1 + pr(i-1)} \cdot w(s, i-1)$$

$$fu(s, i) = (1 - fr(s, i)) \cdot (1 - rfe(s, i))$$

$$uc(s, i, j) = fu(s, j) \cdot [uc(s, i, j-1) + cfpe(s, j) \cdot (1 + pr(0, j-1))]$$

Handling Short Positions and Leverage

To this point, portfolios with only long positions have been considered. Handling short positions is a straightforward generalization of the above concepts. A short position's weight in the actual portfolio is negative. The actions in short positions will be referred to as shorts and covers rather than buys and sells. Conceptually, a short is comparable to a buy, and a cover is comparable to a sell; buys and shorts both increase the exposure to a stock, while sells and covers decrease the exposure. The term increase will be used to denote a buy or a short, and decrease will be used to denote a sell or a cover.

Below are the revised definitions that can be applied to both long and short positions:

$$sell(s, i) = \begin{cases} \min(-\Delta w(s, i), naw(s, i+1)) & \text{if } \Delta w(s, i) < 0 \text{ and } w(s, i) > 0 \\ 0 & \text{otherwise} \end{cases}$$

$$buy(s, i) = \begin{cases} \min(\Delta w(s, i), w(s, i+1)) & \text{if } \Delta w(s, i) > 0 \text{ and } w(s, i+1) > 0 \\ 0 & \text{otherwise} \end{cases}$$

$$short(s, i) =$$
$$\begin{cases} \min(-\Delta w(s, i), -w(s, i+1)) & \text{if } \Delta w(s, i) < 0 \text{ and } w(s, i) < 0 \\ 0 & \text{otherwise} \end{cases}$$

$$cover(s, i) =$$
$$\begin{cases} \min(-\Delta w(s, i), -naw(s, i+1)) & \text{if } \Delta w(s, i) > 0 \text{ and } w(s, i) < 0 \\ 0 & \text{otherwise} \end{cases}$$

$$increase(s, i) = buy(s, i) - short(s, i)$$

The quantity increase(s, i) is positive for long positions and negative for short positions.

$$decrease(s, i) = sell(s, i) - cover(s, i)$$

The quantity decrease(s, i) is positive for long positions and negative for short positions.

The fraction fr(s, i) realized due to an action is then:

$$fr(s, i) = \frac{decrease(s, i)}{naw(s, i+1)}$$

And the fraction fp(s, i) purchased due to an action is:

$$fp(s, i) = \frac{increase(s, i)}{w(s, i+1)}.$$

The method described above for constructing an adjusted portfolio still applies when the actual portfolio has shorts and margin; although the weights of some positions in the actual portfolio become negative, the sum of the weights remains 1.0. But the calculation of the weight $$w(o3, i) = \frac{w(o1, i) \cdot w(o2, i)}{w(o1, i) + w(o2, i) - w(o1, i) \cdot w(o2, i)}$$

to be applied to the actual portfolio when effects of two offsets o1 and o2 are combined can be vulnerable to large floating-point errors when some of the actual portfolio's positions have negative weights; that denominator can be very small or zero.

So the calculations are best performed by partitioning the actual portfolio into two sub-portfolios, one containing the long positions and the other containing the short positions. The offsets are performed within the sub-portfolios. This avoids the singularity, each sub-portfolio has no short positions or leverage. The overall adjusted-portfolio return is obtained by adding together the sub-portfolios' weighted returns.

Turnover Calculation Based on All Actions

It was mentioned above that some embodiments may keep track of how much of a difference in turnover would result from the adjusted portfolio, and an approach that evaluated turnover in terms of sells only was described. Turnover calculations can alternatively be made in a way that reflects all actions, including shorts and covers.

Here are quantities related to turnover evaluated in this way:

$$decreases(i) = \sum_{s \in S} sell(s, i) + cover(s, i)$$

$$increases(i) = \sum_{s \in S} buy(s, i) + cover(s, i)$$

A turnover value based on decreases is given by:

$$decreaseTurns(i, j) = \sum_{k=i}^{j} decreases(k)$$

and an annualized version is given by:

$$decreaseTurnovers(i, j) = \frac{\sum_{k=i}^{j} decreases(k)}{j - i + 1} \cdot 252$$

A turnover value based on increases is given by:

$$increaseTurns(i, j) = \sum_{k=i}^{j} increases(k)$$

and an annualized version is given by:

$$increaseTurnovers(i,j) = \frac{\sum_{k=i}^{j} increases(k)}{j-i+1} \cdot 252$$

To calculate increaseTurns and decreaseTurns for an adjusted portfolio, two inc time-series have to be maintained and populated: decreaseIncs and increaseIncs. These values' computations are similar, mutatis mutandis, to those of the inc values described above.

As was mentioned above, a computer system that implements the present invention's teachings may afford the user the option of selecting from among many of the quantities defined above, or quantities derived from them, as outputs that the system is to provide as measures of a portfolio's performance. This is true not only of the actual portfolio that the input data describe but also of hypothetical portfolios derived from them. Similarly, although the foregoing description has concentrated on hypothetical portfolios determined in specific ways for specific purposes, some embodiments may afford the user the option of customizing the hypothetical portfolios in a wide variety of ways.

Some, for example, may enable the user to choose at a particularly fine granularity the changes that will be used to produce a hypothetical portfolio from an actual one. The user may be able to select an individual action, e.g., the action that occurred in a stated stock on a stated day, and specify a specific type of modulation, e.g., a delay of that action by five days.

Some embodiments may enable the user to specify the changes at a higher level. The user may, for instance, be given the option of selecting a modulation type and of selecting actions by, say, action type, time interval, and position attribute. For example, the user may elect to shifting all buys (or sells, shorts, covers, increases, or decreases) that occurred during the year 2004 in non-cash positions whose ages are less than, say, 63 market days. Instead of or in addition to age, the user may be able to select from among any of the other attributes mentioned above, as well as others, or any combination of them. In each case, the user could specify upper and/or lower limits on those attributes in terms of fixed values or in terms of, say, the relative size of the action or position group that would thereby qualify for modulation.

For some attributes, the user may also be afforded the option of specifying additional parameters. If the attribute is unrealized margin, for example, the user may specify an "anchor" value to indicate the period over which the unrealized margin is to be evaluated. The anchor value would be used as the threshold or quasi-basis for determining gain or loss; an anchor value of –20, for example, might mean that the user wants the basis for qualification to be short-term unrealized margin over the last twenty days.

The user will typically be afforded the option of selecting not only the actions and/or positions to be modulated but also the type of modulation, e.g., of specifying whether the modulation is to be a shift or a change in size. As was the case with the setholding-period example given above, the system may meet some user requests by employing a combination of modulation types, such as (in that case, delay-type) shifts and position offsets.

If the type of modulation is a shift, the user may specify a fixed shift; as was mentioned above; for example, the user may request performance measures for each of a plurality of hypothetical portfolios, each of which results from a different fixed shift. Or, as was exemplified above, the user may specify that the shifts so vary among positions that as many of those positions' holding periods as possible equal the same set value. The user may also be given the capability of selecting whether the shifts to be used for this purpose advance or delay actions.

If the type of modulation is a change in size, the system may afford the user the option of specifying a fixed value or ratio for the size change. By specifying a "factor" input, for example, the user may specify that the hypothetical portfolio should result from actions whose values are products of that factor's value and corresponding actual-portfolio actions. (The factor's value would typically but not necessarily be constrained to be positive.)

The actual portfolio on which a given hypothetical portfolio is based may be one that consists of a user-selected subset of some larger actual portfolio's positions. And, just as the user can choose actions for modulation in accordance with the attribute values exhibited by the positions in which those actions occur, the system may afford the user the capability of defining these subsets in accordance with their positions' attribute values. For this purpose, the system may enable the user to select the number of smaller actual portfolios into which to partition the larger actual portfolio. And it may offer the user the option of partitioning the larger portfolio's positions in accordance with fixed thresholds in the chosen attribute's value or to have the system itself so choose the thresholds as to result in "tiles," whose weights in the larger actual portfolio are equal or have some other predetermined ratio. The "weight" used for this purpose may be based on the positions' weights on some common day or on some other quantity, such as their respective cost bases.

As was mentioned above, the user will typically be given the option of specifying the performance measures that the system should compute for the chosen hypothetical portfolios. Example performance measures are return, risk (e.g., standard deviation of monthly returns), risk-adjusted return (as calculated in accordance with a technique selected by the user from among, say one-, three-, and four-factor models), turnover, and information ratio (the ratio of average monthly relative return to the standard deviation of monthly relative returns). Outputs based on such performance measures may be the values of the measures themselves or comparisons of those values with the corresponding values determined for other portfolios or market indexes. Among the type of comparison may be simple differences, ratios, side-by-side displays, or other ways of describing one quantity by reference to another.

The present invention enables a portfolio's performance to be assessed in ways that are particularly sensitive to tactical aspects. It thus constitutes a significant advance in the art.

What is claimed is:

1. A method for computing a hypothetical portfolio's return, comprising:
   A) computing by a computer system that includes at least one computer, the hypothetical portfolio's return for each of a plurality of record times by:
      i) determining, for a final offset for that record time, a respective offset return for that record time from that record time's returns of assets that have been indicated, by input signals that the computer system has received and that specify an actual portfolio's holdings on each of a plurality of record times, to have been held in the actual portfolio during some period; and ii) adding that final offset return to the product of:
   a) a weight value associated with that final offset for that record time; and
   b) the actual portfolio's return for that record time; and B) generating by the computer system, an output based on the hypothetical portfolio's returns thus determined.

2. A method as defined in claim 1 wherein the offset return for the final offset equals the sum of products of assets' returns for that record time and respective weights, wherein those weights add to the difference between 100% and the weight associated with the final offset.

3. A method as defined in claim 1 wherein:
A) the method includes identifying individual offsets to be made to actions and/or positions in the actual portfolio, whereby each individual offset is associated with a single respective action or position in an asset drawn from those that the portfolio data indicate have been held in the actual portfolio during some period;

B) the final offset return for at least one, given record time is determined by:
   i) for each such individual offset that is to be used in computing the hypothetical portfolio's return, determining an offset return associated therewith such that:
      a) the offset return for that individual offset for the given record time equals the product of:
         (1) the difference between 100% and a weight associated with that individual offset and the given record time; and
         (2) the given record time's return of the asset associated with that individual offset; and
      b) the return that the actual portfolio would have had on the given record time in the absence of that action or position equals the sum of:
         (1) that offset return for the given record time; and
         (2) the actual return for the given record time weighted by the weight associated with that offset and the given record time; and
   ii) determining the final offset return for the given record time as the offset return for a combination offset, where the offset return for each combination offset is determined from offset returns for first and second said individual and/or combination offsets by computing the sum of:
      a) the product of:
         (1) the offset return computed for the first offset for the given record time; and
         (2) the ratio that a weight associated with the given record time and that combination offset bears to the weight associated with the given record time and the first offset, wherein the weight associated with the given record time and that combination offset equals the ratio that the product of the weights associated with the given record time and the first and second offsets bears to the difference between the sum of those weights and their product; and
      b) the product of:
         (1) the offset return computed for the second offset for the given record time; and
         (2) the ratio that the weight associated with the given record time and that combination offset bears to the weight associated with the given record time and the second offset.

4. A method as defined in claim 3 wherein the offset return for the final offset equals the sum of products of assets' returns for that record time and respective weights, wherein those weights add to the difference between 100% and the weight associated with the final offset.

5. A portfolio-analysis system comprising:
at least one computer configured to:
A) compute a hypothetical portfolio's return for each of a plurality of record times by:
   i) determining, for a final offset for that record time, a respective offset return for that record time from that record time's returns of assets that have been indicated, by input signals that the portfolio-analysis system has received and that specify an actual portfolio's holdings on each of a plurality of record times, to have been held in the actual portfolio during some period; and
   ii) adding that final offset return to the product of:
      a) a weight value associated with that final offset for that record time; and
      b) the actual portfolio's return for that record time; and
B) generate an output based on the hypothetical portfolio's returns thus determined.

6. A portfolio-analysis system as defined in claim 5 wherein the offset return for the final offset equals the sum of products of assets' returns for that record time and respective weights, wherein those weights add to the difference between 100% and the weight associated with the final offset.

7. A portfolio-analysis system as defined in claim 5 wherein:
A) at least one said computer is further configured to identify individual offsets to be made to actions and/or positions in the actual portfolio, whereby each individual offset is associated with a single respective action or position in an asset drawn from those that the portfolio data indicate have been held in the actual portfolio during some period;

B) the final offset return for at least one, given record time is determined by:
   i) for each such individual offset that is to be used in computing the hypothetical portfolio's return, determining an offset return associated therewith such that:
      a) the offset return for that individual offset for the given record time equals the product of:
         (1) the difference between 100% and a weight associated with that individual offset and the given record time; and
         (2) the given record time's return of the asset associated with that individual offset; and
      b) the return that the actual portfolio would have had on the given record time in the absence of that action or position equals the sum of:
         (1) that offset return for the given record time; and
         (2) the actual return for the record time weighted by the weight associated with that offset and the given record time; and
   ii) determining the final offset return for the given record time as the offset return for a combination offset, where the offset return for each combination offset is determined from offset returns for first and second said individual and/or combination offsets by computing the sum of:
      a) the product of:
         (1) the offset return computed for the first offset for the given record time; and (2) the ratio that a weight associated with the given record time and that combination offset bears to the weight associated with the given record time and the first offset, wherein the weight associated with that record time and that combination offset equals the ratio that the product of the weights associated with the given record time and the first and second offsets bears to the difference between the sum of those weights and their product; and b) the product of:
(1) the offset return computed for the second offset for the given record time; and
(2) the ratio that the weight associated with the given record time and that combination offset bears to the weight associated with the given record time and the second offset.

8. A portfolio-analysis system as defined in claim 7 wherein the offset return for the final offset equals the sum of products of assets' returns for that record time and respective weights, wherein those weights add to the difference between 100% and the weight associated with the final offset.

9. A computer-readable storage medium containing machine instructions that, when executed by a computer system that includes a least one computer, cause that computer system to:
A) compute a hypothetical portfolio's return for each of a plurality of record times by:
i) determining, for a final offset for that record time, a respective offset return for that record time from that record time's returns of assets that have been indicated, by input signals that the computer system has received and that specify an actual portfolio's holdings on each of a plurality of record times, to have been held in the actual portfolio during some period; and
ii) adding that final offset return to the product of:
a) a weight value associated with that final offset for that record time; and
b) the actual portfolio's return for that record time; and
B) generate an output based on the hypothetical portfolio's returns thus determined.

10. A storage medium as defined in claim 9 wherein the offset return for the final offset equals the sum of products of assets' returns for that record time and respective weights, wherein those weights add to the difference between 100% and the weight associated with the final offset.

11. A storage medium as defined in claim 9 wherein:
A) the machine instructions further configure the computer system to identify individual offsets to be made to actions and/or positions in the actual portfolio, whereby each individual offset is associated with a single respective action or position in an asset drawn from those that the portfolio data indicate have been held in the actual portfolio during some period;
B) the final offset return for at least one, given record time is determined by:
i) for each such individual offset that is to be used in computing the hypothetical portfolio's return, determining an offset return associated therewith such that:
a) the offset return for that individual offset for the given record time equals the product of:
(1) the difference between 100% and a weight associated with that individual offset and the given record time; and
(2) the given record time's return of the asset associated with that individual offset; and
b) the return that the actual portfolio would have had on the given record time in the absence of that action or position equals the sum of:
(1) that offset return for the given record time; and
(2) the actual return for the given record time weighted by the weight associated with that offset and the given record time; and
ii) determining the final offset return for the given record time as the offset return for a combination offset, where the offset return for each combination offset is determined from offset returns for first and second said individual and/or combination offsets by computing the sum of:
a) the product of:
(1) the offset return computed for the first offset for the given record time; and
(2) the ratio that a weight associated with the given record time and that combination offset bears to the weight associated with the given record time and the first offset, wherein the weight associated with that record time and that combination offset equals the ratio that the product of the weights associated with the given record time and the first and second offsets bears to the difference between the sum of those weights and their product; and
b) the product of:
(1) the offset return computed for the second offset for the given record time; and
(2) the ratio that the weight associated with the given record time and that combination offset bears to the weight associated with the given record time and the second offset.

12. A storage medium as defined in claim 11 wherein the offset return for the final offset equals the sum of products of assets' returns for that record time and respective weights, wherein those weights add to the difference between 100% and the weight associated with the final offset.

* * * * *